United States Patent
Wakazono et al.

(10) Patent No.: US 9,046,444 B2
(45) Date of Patent: Jun. 2, 2015

(54) TIRE TESTING DEVICE

(75) Inventors: Takehiko Wakazono, Takasago (JP);
Tetsuya Yoshikawa, Takasago (JP);
Glen Thompson, Hudson, OH (US);
Yasuhiko Fujieda, Takasago (JP);
Shogo Sarumaru, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 189 days.

(21) Appl. No.: 13/885,349

(22) PCT Filed: Dec. 13, 2011

(86) PCT No.: PCT/JP2011/006937
§ 371 (c)(1),
(2), (4) Date: May 14, 2013

(87) PCT Pub. No.: WO2012/081226
PCT Pub. Date: Jun. 21, 2012

(65) Prior Publication Data
US 2013/0233066 A1    Sep. 12, 2013

(30) Foreign Application Priority Data

Dec. 15, 2010 (JP) ................................. 2010-279319
Jan. 13, 2011 (JP) ................................. 2011-005272
Jan. 13, 2011 (JP) ................................. 2011-005275

(51) Int. Cl.
*E01C 23/00* (2006.01)
*G01M 17/02* (2006.01)
(Continued)

(52) U.S. Cl.
CPC .................................. *G01M 17/021* (2013.01)

(58) Field of Classification Search
None
See application file for complete search history.

(56) References Cited

U.S. PATENT DOCUMENTS

| 3,552,200 A | 1/1971 | Hermanns et al. | |
| 5,099,684 A * | 3/1992 | Okamoto | 73/146 |
| 5,107,702 A * | 4/1992 | Iwama | 73/146 |

(Continued)

FOREIGN PATENT DOCUMENTS

| CN | 1228533 A | 9/1999 |
| CN | 1954201 A | 4/2007 |

(Continued)

OTHER PUBLICATIONS

Japanese Office Action Issued Mar. 19, 2013 in JP Patent Application No. 2010-279319 Filed Dec. 15, 2010.

(Continued)

*Primary Examiner* — Peter MacChiarolo
*Assistant Examiner* — Jermaine Jenkins
(74) *Attorney, Agent, or Firm* — Oblon, McClelland, Maier & Neustadt, L.L.P.

(57) ABSTRACT

To effectively suppress a shift of a rotating axis of an upper chuck with respect to a rotating axis of a lower chuck due to a separating force. A tire testing device (1) includes: vertical frames (30a, 30b) which are supported by a lower frame (20); a beam (40) which bridges between the vertical frames (30a, 30b) and is movable in the vertical direction; an upper chuck (45) which is attached to the center of the beam (40), the center corresponding to the center of the beam in the longitudinal direction; and a lower chuck (25) which is attached to the lower frame. When viewed from the vertical direction, a rotating axis of an upper rotating member (47) is positioned at the center of a straight line formed by connecting supporting points where each of the vertical frames (30a, 30b) support the beam (40).

29 Claims, 15 Drawing Sheets

(51) Int. Cl.
*B60C 23/00* (2006.01)
*B60C 23/02* (2006.01)

(56) References Cited

U.S. PATENT DOCUMENTS

| | | | |
|---|---|---|---|
| 5,562,358 A * | 10/1996 | Okamoto et al. | 403/371 |
| 5,992,227 A | 11/1999 | Jellison et al. | |
| 6,089,084 A * | 7/2000 | Nishihara et al. | 73/146 |
| 6,131,455 A | 10/2000 | Matsumoto et al. | |
| 6,308,566 B1 | 10/2001 | Matsumoto et al. | |
| 6,513,372 B2 * | 2/2003 | Anno et al. | 73/146 |
| 6,772,626 B1 * | 8/2004 | Engel et al. | 73/146 |
| 7,340,947 B2 * | 3/2008 | Shinomoto et al. | 73/146 |
| 8,342,020 B2 * | 1/2013 | Sumimoto et al. | 73/462 |
| 8,464,579 B2 * | 6/2013 | Nakayama et al. | 73/146 |
| 2002/0124650 A1 | 9/2002 | Matsumoto | |
| 2005/0188755 A1 | 9/2005 | Cargould et al. | |
| 2007/0220964 A1 | 9/2007 | Shinomoto et al. | |
| 2014/0060181 A1 * | 3/2014 | Tachibana et al. | 73/460 |

FOREIGN PATENT DOCUMENTS

| | | |
|---|---|---|
| JP | 3 78240 | 8/1991 |
| JP | 9 58231 | 3/1997 |
| JP | 9-126956 A | 5/1997 |
| JP | 10 160643 | 6/1998 |
| JP | 2002-350273 A | 12/2002 |
| JP | 2002-350273 A5 | 12/2002 |
| JP | 2003 4597 | 1/2003 |
| JP | 2004 156933 | 6/2004 |
| JP | 2004 205276 | 7/2004 |
| JP | 2005 9648 | 1/2005 |
| JP | 2006 143078 | 6/2006 |
| JP | 2006 145297 | 6/2006 |
| JP | 2006 266916 | 10/2006 |
| JP | 4011632 | 11/2007 |
| JP | 2009 75064 | 4/2009 |
| JP | 2010-204018 A | 9/2010 |

OTHER PUBLICATIONS

International Search Report Issued Feb. 21, 2012 in PCT/JP11/06937 Filed Dec. 13, 2011.

* cited by examiner

TIRE TESTING DEVICE

TECHNICAL FIELD

The present invention relates to a tire testing device which performs a tire performance test.

BACKGROUND ART

In the publication described in Patent Document 1, there is disclosed a tire testing device which includes a lower frame, a portal frame, a lower chuck, and an upper chuck. The portal frame is uprightly provided in the lower frame. The portal frame includes a pair of vertical frames which respectively extends upward in the vertical direction from both ends of the lower frame in the longitudinal direction and a horizontal frame which extends between the upper ends of the vertical frames. The lower chuck is attached to the lower frame. The upper chuck is attached to the horizontal frame of the portal frame. Each of the lower chuck and the upper chuck includes a rotation member. In the tire testing device, air is supplied to an inner space of a tire while the tire is nipped between the lower chuck and the upper chuck. Further, various performance tests are performed while the respective rotation members rotate the tire.

In a state where air is supplied to the inner space of the tire, the pneumatic pressure of the inner space applies a force (hereinafter, referred to as a separating force) for separating the upper chuck from the lower chuck to the upper chuck. The separating force is transmitted from the upper chuck to the vertical frame and the lower frame through the horizontal frame.

CITATION LIST

Patent Document

Patent Document 1: Japanese Patent No. 4011632

SUMMARY OF INVENTION

Technical Problem

In the tire testing device disclosed in the publication of Patent Document 1, the upper chuck is attached to a portion adjacent to one vertical frame provided with search equipment in the horizontal frame instead of the center of the horizontal frame in the longitudinal direction. For this reason, the horizontal frame is deformed by the separating force acting on the upper chuck. The deformation causes the upper chuck to be inclined with respect to the vertical line and causes the rotating axis of the upper chuck to be inclined with respect to the rotating axis of the lower chuck extending in the vertical direction. The shift of the rotating axis of the upper chuck with respect to the rotating axis of the lower chuck adversely influences the test precision.

It is an object of the invention to provide a tire testing device capable of effectively suppressing the shift of the rotating axis of the upper chuck with respect to the rotating axis of the lower chuck due to the separating force.

Means for Solving Problem

In order to attain the above-described object, according to the invention, there is provided a tire testing device which tests a tire, the tire testing device including: a lower frame; a pair of vertical frames which is supported by the lower frame and respectively extends upward in the vertical direction from portions away from each other in the lower frame; a beam which is laid between the pair of vertical frames in an extending posture and is supported by the vertical frames; a lower chuck which includes a lower rotation member rotatable about the axis extending in the vertical direction and is attached to the lower frame; an upper chuck which includes an upper rotation member rotatable about the axis along the vertical direction along with the lower rotation member and is attached to the center of the beam in the longitudinal direction so as to nip the tire, conveyed to the upper side of the lower chuck, between the upper and lower chucks by the engagement therebetween while an inner space of the tire is sealed; a moving unit which moves the upper chuck in the vertical direction; a fixing unit which immovably fixes the upper chuck with respect to the vertical direction; and an air supply unit which supplies air to the inner space while the upper chuck is fixed by the fixing unit and the tire is nipped between the upper chuck and the lower chuck by sealing the inner space, wherein when air is supplied to the inner space of the tire by at least the air supply unit, the rotating axis of the upper rotation member is positioned at the center of a straight line connecting support points where the respective vertical frames support the beam.

Effect of the Invention

According to the invention, it is possible to effectively suppress the shift of the rotating axis of the upper chuck with respect to the rotating axis of the lower chuck due to the separating force.

DESCRIPTION OF EMBODIMENTS

Figure 1:
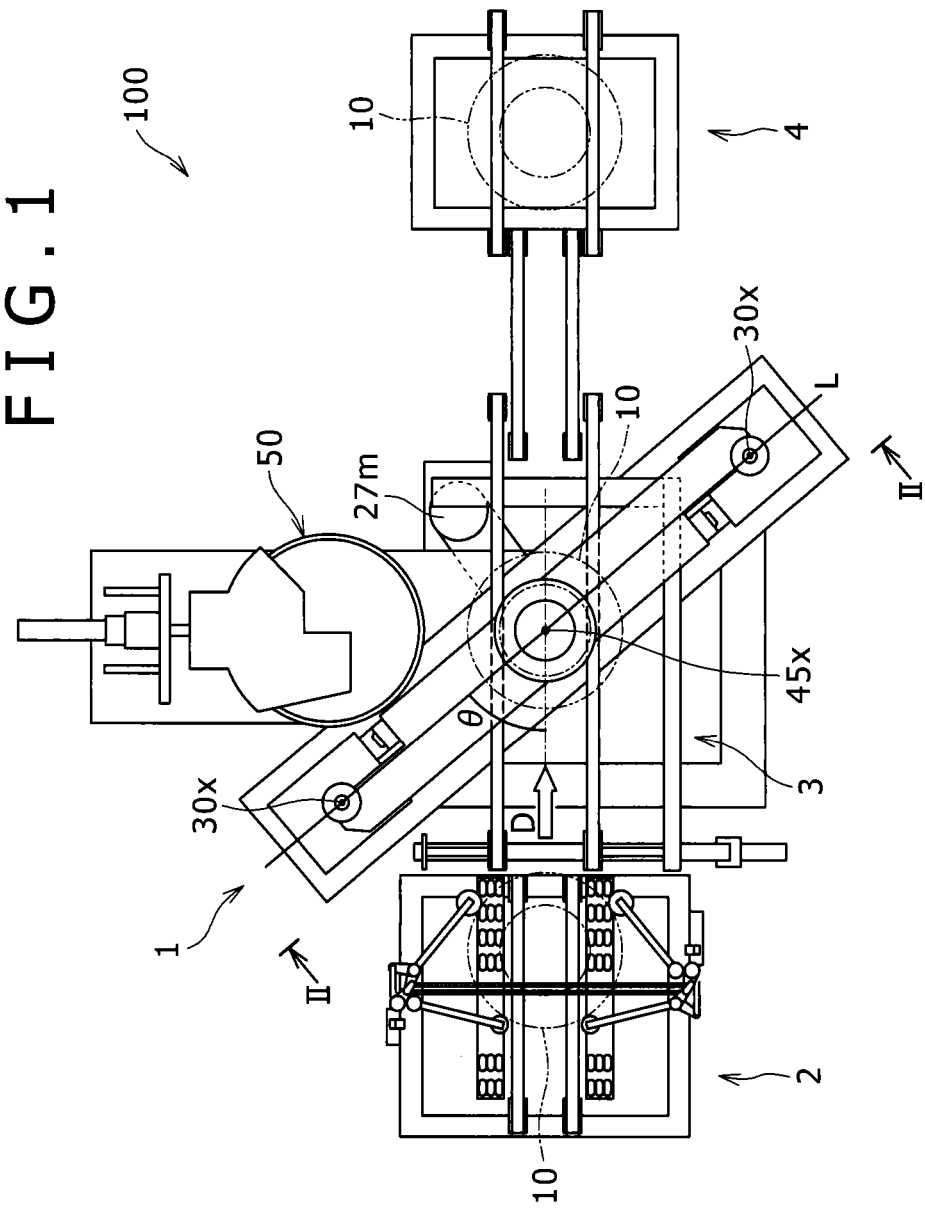
[FIG. 1] is a plan view illustrating an entire tire testing system which includes a tire testing device according to a first embodiment of the invention.

Hereinafter, preferred embodiments of the invention will be described by referring to the drawings.

First, an entire configuration of a tire testing system 100 which includes a tire testing device 1 according to a first embodiment of the invention will be described by referring to FIG. 1.

A tire testing system 100 includes an entrance conveyor 2, a center conveyor 3, and an exit conveyor 4 in addition to the tire-testing device 1. The respective conveyors 2, 3, and 4 convey a tire 10 as a conveying subject in the conveying direction D. Hereinafter, a straight line which extends in the conveying direction D and conveys the tire 10 thereon is appropriately referred to as a conveying line. The tire testing device 1 is provided in the center conveyor 3, and tests the tire which is conveyed from the entrance conveyor 2 to the center conveyor 3 in the conveying direction D. The respective conveyors 2, 3, and 4 are arranged in series, and hence the conveying line D is formed as a straight line. Furthermore, the conveying line D may be formed as a curve, but the straight line is desirable. A method of testing the tire 10 by the tire testing system 100 will be described later in detail.

Figure 2:
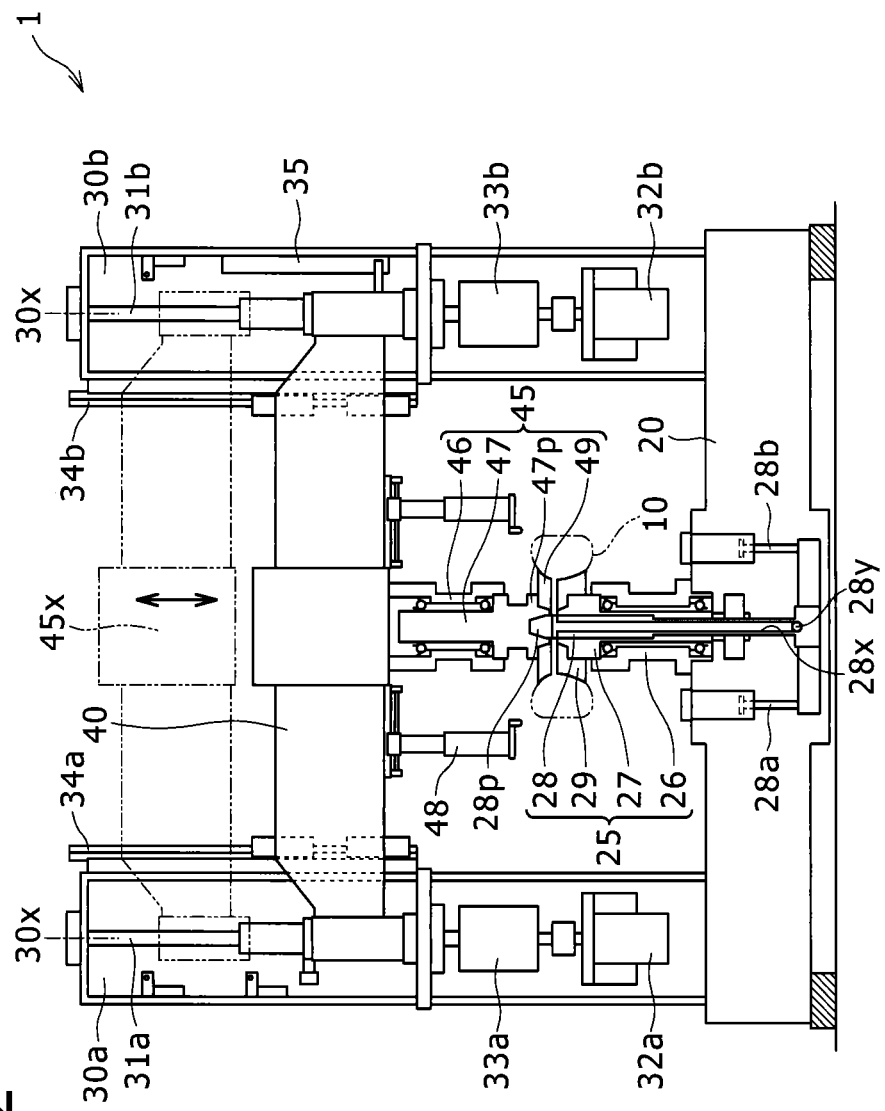
[FIG. 2] is a side view of the tire testing device according to the first embodiment of the invention when viewed from a plane taken along line II-II of FIG. 1.
Figure 3:
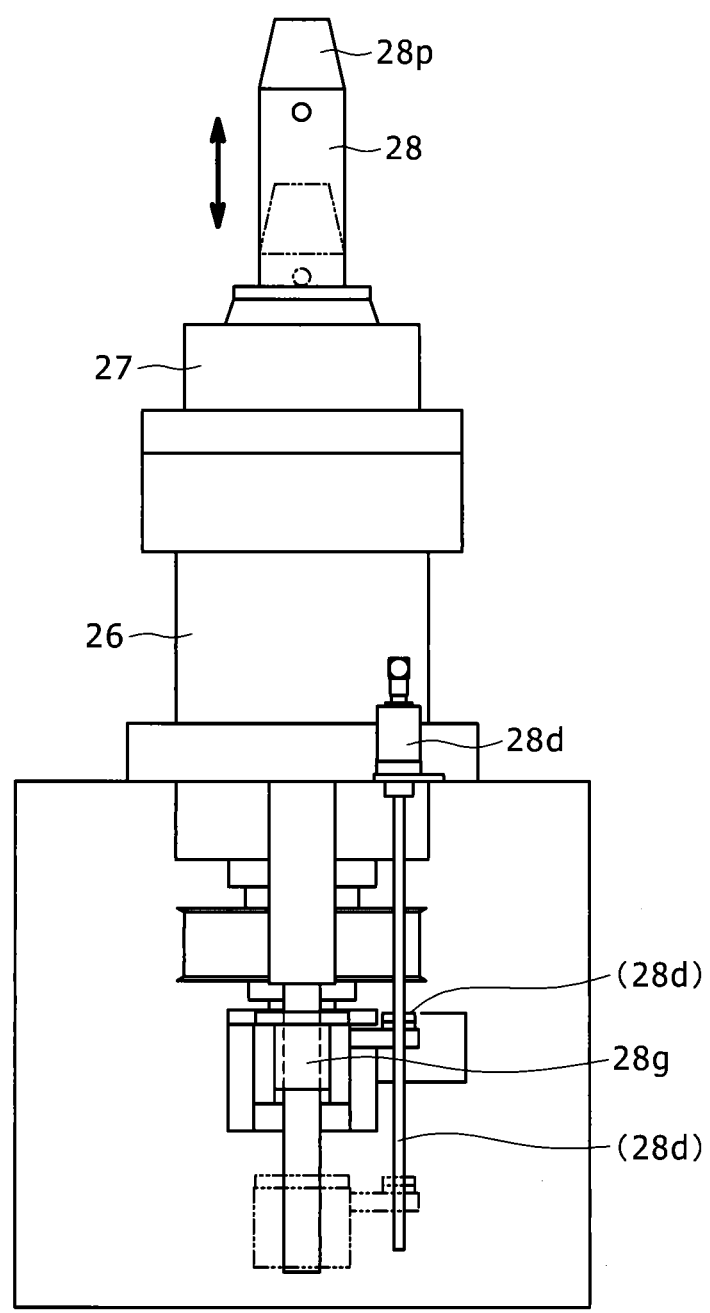
[FIG. 3] is a partial side view illustrating a lower chuck (where a lower rim is not illustrated)

Referring to FIGS. 1 to 3, a configuration of the tire testing device 1 will be described.

As illustrated in FIG. 2, the tire testing device 1 includes a lower frame 20, a pair of vertical frames 30a and 30b which is attached onto the lower frame 20, and a beam 40 which is laid between the vertical frames 30a and 30b above the lower frame 20.

The tire testing device 1 includes a lower chuck 25 which is attached to the lower frame 20 and an upper chuck 45 which is attached to the beam 40. The lower chuck 25 and the upper chuck 45 nip the tire 10 therebetween. As described below, the lower chuck 25 is provided with an air supply hole 28x which serves as an air supply unit for supplying air to the inner space of the tire 10.

The tire testing device 1 includes ball screws 31a and 31b which serve as a beam moving unit for moving the beam 40 along the vertical frames 30a and 30b in the vertical direction and serves as a moving unit for moving the upper chuck 45 in the vertical direction and motors 32a and 32b which are configured as servo motors.

The tire testing device 1 includes electromagnetic brakes 33a and 33b which serve as a lock mechanism for immovably fixing the beam 40 in the vertical direction and serves as a fixing unit for immovably fixing the upper chuck in the vertical direction.

The tire testing device 1 includes linear motion guides 34a and 34b which serve as a guide member for guiding the movement of the beam 40 along the vertical frames 30a and 30b in the vertical direction.

The tire testing device 1 includes a linear sensor (chuck position detecting unit) 35 which detects the position of the beam 40 in the vertical direction and the position of the upper chuck 45 in the vertical direction so as to detect the relative position between the upper chuck 45 and the lower chuck 25 in the vertical direction.

The tire testing device 1 includes a drum (load application member) 50. The drum 50 applies a load to the tire 10 (indicated by the chain line in FIG. 1) nipped between the lower chuck 25 and the upper chuck 45. As illustrated in FIG. 1, the drum 50 is disposed so as to be away from the tire 10 nipped between the lower chuck 25 and the upper chuck 45 toward one side (the upper side in FIG. 1) in a direction perpendicular to the conveying direction D. Hereinafter, a direction (the up to down direction of FIG. 1) perpendicular to the conveying direction D is appropriately referred to as the left to right direction. Then, the side provided with the drum 50 is set as the left side and the opposite side is set as the right side.

The tire testing device 1 includes a tire stripper 48. The tire stripper 48 separates the tire 10 from the upper chuck 45 after various performance tests of the tire 10.

The tire testing device 1 includes a controller (a control unit not illustrated in the drawing) which controls operations of respective components the tire testing device 1 and operations of respective components of the tire testing system 100.

The lower frame 20 extends in the horizontal direction and the left to right direction. The center of the lower frame 20 in the longitudinal direction substantially matches the center of the center conveyor 3 on the conveying line. The lower frame 20 extends in the left to right direction with the conveying line of the tire 10 interposed therebetween.

Specifically, the straight line L which extends in the longitudinal direction of the lower frame 20 is not perpendicular to the conveying direction D of the tire 10, but is inclined so as to form an acute angle or an obtuse angle as illustrated in FIG. 1. In the first embodiment, the straight line L is inclined rightward with respect to the conveying direction D.

Specifically, an angle θ formed between the upstream portion of the center of the center conveyor 3 in the conveying direction of the straight line L and the upstream portion of the center of the center conveyor 3 in the conveying direction of the conveying line is an acute angle. An angle formed between the upstream portion of the center of the center conveyor 3 in the conveying direction of the straight line L and the downstream portion of the center of the center conveyor 3 in the conveying direction of the conveying line is an obtuse angle (180°-θ).

The drum 50 is disposed between the upstream portion of the center of the center conveyor 3 in the conveying direction of the straight line L and the downstream portion of the center of the center conveyor 3 in the conveying direction of the conveying line which form an obtuse angle.

Here, the angle θ is 20 to 80° (desirably, 35 to 65° in consideration of the arrangement of the entrance conveyor 2 and the drum 50), and is approximately 50° in the embodiment.

The lower frame 20 is made by, for example, steel plates bonded to one another by welding or a steel member such as an H-shaped or I-shaped steel member.

The vertical frames 30a and 30b extend upward in the vertical direction from the upper surface of the lower frame 20. The vertical frames 30a and 30b are supported by the upper surface of the lower frame 20 through bolts and nuts.

The vertical frames 30a and 30b extend upward from both ends of the lower frame 20 in the longitudinal direction, and are arranged on the straight line L extending along the longitudinal direction of the lower frame 20. Specifically, the center axes 30x and 30y which extend in the vertical direction of the vertical frames 30a and 30b are present on the straight line L when viewed in the vertical direction. Accordingly, the support points (the points where the separating force transmitted from the upper chuck 45 to the vertical frames 30a and 30b through the beam 40 is exerted) which are present on the center axes 30x and 30y and support the vertical frames 30a and 30b by the lower frame 20 are present on the straight line L. Further, as illustrated in FIGS. 1 and 2, the respective center axes 30x and 30y of the vertical frames 30a and 30b are present at the symmetrical positions about the center of the lower frame 20 in the longitudinal direction while being offset by the same distance from the center of the lower frame 20 in the longitudinal direction along the straight line L.

In the first embodiment, the pair of vertical frames 30a and 30b is substantially formed in the same shape so as to prevent a difference in strength therebetween. The vertical frames 30a and 30b are made of, for example, steel plates bonded to one another by welding or an angular steel pipe.

The linear motion guides 34a and 34b are respectively attached to the facing surfaces of the vertical frames 30a and 30b. Further, the vertical frames 30a and 30b are respectively provided with the ball screws 31a and 31b. The ball screws 31a and 31b extend in the vertical direction inside the respective inner spaces of the vertical frames 30a and 30b. The center axes of the ball screws 31a and 31b extend along the center axes 30x and 30y of the vertical frames 30a and 30b.

The beam 40 extends in the horizontal direction between the vertical frames 30a and 30b. Both ends of the beam 40 in the longitudinal direction are connected to the respective nuts of the ball screws 31a and 31b inside the vertical frames 30a and 30b. The inner portion of the beam 40 in the longitudinal direction in relation to the connection portion with the vertical frames 30a and 30b is connected to the linear motion guides 34a and 34b. In this way, the beam 40 is supported by the pair of vertical frames 30a and 30b through the ball screws 31a and 31b and the linear motion guides 34a and 34b.

As described above, the center axes 30x and 30y of the vertical frames 30a and 30b are offset by the same distance along the straight line L from the center of the lower frame 20 in the longitudinal direction. Thus, the points which are support points for supporting the beam 40 by the vertical frames 30a and 30b and are present on the center axes 30x and 30y of the vertical frames 30a and 30b are present on the straight line L when viewed from the vertical direction, and are present the positions away from the center of the lower frame 20 in the longitudinal direction by the same distance.

The beam 40 moves upward or downward in the vertical direction while being guided by the linear motion guides 34a and 34b with the rotation of the ball screws 31a and 31b.

Here, the linear motion guides 34a and 34b respectively include guide rails which extend in the vertical direction and a rolling bearing (bearing) which includes a roll (rolling element) interposed between the guide rail and the guiding subject (here, the beam 40), and smoothly moves the guiding subject in a linear manner by guiding the guiding subject through the rotation of the roll.

The beam 40 is made so as to prevent a difference in strength about the center in the longitudinal direction. Specifically, in the first embodiment, as illustrated in FIG. 1, the beam 40 has a symmetrical shape in the longitudinal direction about the center in the longitudinal direction. The beam 40 is made of, for example, steel plates bonded to one another by welding or an H-shaped or I-shaped steel member.

The ball screws 31a and 31b are respectively connected with the motors 32a and 32b and the electromagnetic brakes 33a and 33b. The electromagnetic brakes 33a and 33b are respectively provided between the ball screws 31a and 31b and the motors 32a and 32b.

The ball screws 31a and 31b are respectively driven in a synchronization state by different motors 32a and 32b. When the ball screws 31a and 31b are rotationally driven by the motors 32a and 32b, the beam 40 moves in the vertical direction.

The electromagnetic brakes 33a and 33b prohibit the rotation of the ball screws 31a and 31b. Since the electromagnetic brakes 33a and 33b prohibit the rotation of the ball screws 31a and 31b, the movement of the beam 40 in the vertical direction is prohibited.

The linear sensor 35 is provided in one vertical frame 30b. The linear sensor 35 detects the position of the beam 40 in the vertical direction. The linear sensor 35 outputs a signal having a linear relation with the position of the vertical frame 30b.

The lower chuck 25 is disposed at the center of the lower frame 20 in the longitudinal direction. The lower chuck 25 includes a lower spindle housing 26, a lower spindle (lower rotation member) 27, a plunger 28 (lower rotation member), and a lower rim 29. The lower spindle housing 26 is immovably fixed to the lower frame 20. The lower spindle 27 is received inside the lower spindle housing 26. The plunger 28 is disposed inside the lower spindle 27. The lower rim 29 is fixed to the upper end of the lower spindle 27.

The lower spindle 27 rotates about the axis extending in the vertical direction by the driving of a motor 27m (see FIG. 1). The lower spindle 27 may not move in the vertical direction in a telescopic manner.

The lower rim 29 is disposed so as to surround the upper end of the lower spindle 27. The lower rim 29 rotates about the axis taken along the vertical direction together with the lower spindle 27.

The plunger 28 is a bar member which is thin and long in the vertical direction. The plunger 28 rotates about the axis taken along the vertical direction together with the lower spindle 27.

The upper end of the plunger 28 in the vertical direction is formed as a tapered convex portion 28p of which the outer peripheral surface is formed as an inclined surface (lower chuck side inclined surface) inclined with respect to the vertical direction. Specifically, the convex portion 28p is thinned upward.

An air supply hole 28x is formed inside the plunger 28 in the vertical direction from the lower end thereof to the convex portion 28p of the upper end thereof. The air supply hole 28x is connected to a rotary joint 28y disposed at the lower end of the plunger 28. External compressed air is supplied to the air supply hole 28x through the rotary joint 28y. The compressed air passes through the air supply hole 28x and is supplied from the upper end of the plunger 28 to the inner space of the tire 10.

The plunger 28 may move in a telescopic manner in the vertical direction by the driving of the air cylinders 28a and 28b, and may move relatively with respect to the lower spindle 27 and the lower rim 29 in the vertical direction.

The plunger 28 is connected with the guide member 28g (see FIG. 3) which moves in the vertical direction together with the plunger 28. The tire testing device 1 according to the embodiment includes a linear sensor 28d which detects the position of the guide member 28g and the position of the plunger 28 in the vertical direction. The linear sensor 28d outputs a signal having a linear relation with the position of the guide member 28g and the position of the plunger 28 in the vertical direction.

Furthermore, the linear sensor 28d may be attached to a member other than the guide member 28g. For example, the linear sensor may be attached to the plunger 28 or may be embedded in the air cylinders 28a and 28b.

The upper chuck 45 includes an upper spindle housing 46, an upper spindle (upper rotation member) 47, and an upper rim 49. The upper spindle housing 46 is a cylindrical member that extends in the up to down direction, and the upper portion thereof is fixed to the beam. The upper spindle 47 is received inside the upper spindle housing 46. The upper rim 49 is fixed to the lower end of the upper spindle 47.

The upper spindle 47 engages with the lower spindle 27 and rotates about the axis extending in the vertical direction together with the lower spindle 27. The lower end of the upper spindle 47 in the vertical direction is provided with a concave portion 47p which engages with the convex portion 28p of the upper end of the plunger 28 of the lower chuck 25. Specifically, the inner peripheral surface of the concave portion 47p is an inclined surface (upper chuck side inclined surface) is an inclined surface which is inclined at the same angle as that of the outer peripheral surface of the convex portion 28p inclined with respect to the vertical direction. When the convex portion 28p is inserted into the concave portion 47p, the inner peripheral surface of the concave portion 47p engages with the outer peripheral surface of the convex portion 28p, and the upper spindle 47 engages with the lower spindle 27.

The upper rim 49 is disposed so as to surround the lower end of the upper spindle 47. The upper rim 49 rotates about the axis extending in the vertical direction along with the upper spindle 47.

As illustrated in FIG. 2, the upper chuck 45 is attached to the center of the beam 40 in the longitudinal direction. Specifically, the upper chuck 45 is attached so that the attachment center is positioned on the rotating axis 45x extending in the vertical direction of the upper spindle 47, the rotating axis 45x is positioned on the straight line L when viewed in the vertical direction, and the rotating axis 45x is positioned in the middle of the center axes 30x and 30y of the vertical frames 30a and 30b. In this way, the rotation center of the upper chuck 45 is positioned at the middle of the support points (the points on the center axes 30x and 30y) in which the beam 40 is supported by the vertical frames 30a and 30b.

The upper chuck 45 moves upward or downward in the vertical direction along the vertical frames 30a and 30b while being held by the beam 40 with the rotation of the ball screws 31a and 31b along with the driving of the motors 32a and 32b. In this way, in the first embodiment, the upper chuck 45 moves with the movement of the beam 40. The upper chuck 45 is immovably fixed to the vertical frames 30a and 30b along with the beam 40 in a manner such that the electromagnetic brakes 33a and 33b prohibit the rotation of the ball screws 31a and 31b so as to prohibit the movement of the beam 40. In this way, in the first embodiment, the upper chuck 45 is fixed with the immovable fixing of the beam 40.

Since the beam 40 and the upper chuck 45 are fixed by the electromagnetic brakes 33a and 33b, the upper chuck 45 moves in the vertical direction by the separating force acting on the tire 10 as described below, so that the relative movement between the upper and lower chucks 25 and 45 is prohibited.

The upper chuck 45 and the lower chuck 25 face each other in the vertical direction with the center of the lower frame 20 in the longitudinal direction interposed therebetween. In the lower spindle 27, the plunger 28, and the lower rim 29 of the lower chuck 25 and the upper spindle 47 and the upper rim 49 of the upper chuck 45, the respective rotating axes 45x match one another.

The tire stripper 48 is disposed at the lateral side of the upper chuck 45.

Next, a method of testing the tire 10 using the tire testing system 100 will be described. Furthermore, the operations of respective components of the tire testing system 100 are controlled by the controller.

First, the tire 10 is conveyed onto the entrance conveyor 2. A lubricant is coated onto the bead portion of the tire 10 on the entrance conveyor 2. Subsequently, the tire 10 is passed from the entrance conveyor 2 onto the center conveyor 3. The center conveyor 3 is positioned above the lower rim 29 before conveying the tire 10. When the tire 10 is conveyed to the center conveyor 3, the center conveyor moves downward while holding the tire 10 so that the tire 10 is placed on the lower rim 29 of the lower chuck 25 illustrated in FIG. 2.

The beam 40 stops at the uppermost movement position as the standby position until the tire 10 is conveyed from the entrance conveyor 2 onto the center conveyor 3. Furthermore, the standby position of the beam 40 may be any position in which the upper rim 49 is positioned at the upper side so as to be away from the bead of the tire 10 and the upper chuck 45 does not interfere with the tire 10. For example, when the standby position is set as the lowermost movement position where the upper rim 49 does not interfere with the tire 10, it is possible to shorten the time necessary for the beam 40 to move downward from the standby position to the test position to be described later.

The beam 40 starts to move downward from the standby position at the same time when the center conveyor 3 starts to move downward. Specifically, the motors 32a and 32b start the rotation of the ball screws 31a and 31b so as to start the downward movement of the beam 40. At the same time when the beam 40 moves downward, the plunger 28 of the lower chuck 25 starts to be stretched upward by the driving of the air cylinders 28a and 28b. In this way, the upper chuck 45 attached to the beam 40 and the plunger 28 of the lower chuck 25 move in a direction of approaching each other.

The motors 32a and 32b are controlled in response to the position of the beam 40 detected by the linear sensor 35. Specifically, when the linear sensor 35 detects that the position of the beam 40 approaches the engagement position between the convex portion 28p of the plunger 28 and the concave portion of the upper spindle 47, the motors 32a and 32b are decelerated. The beam 40 further moves downward after reaching the engagement position. During this downward movement, the upper chuck 45 presses the plunger 28 of the lower chuck 25 downward.

When it is checked that the position of the beam 40 reaches the test position in which the gap between the lower rim 29 and the upper rim 49 becomes a reference width as a specific bead width in response to the tire 10 based on the position of the plunger 28 detected by the linear sensor 28d, the motors 32a and 32b stop, so that the rotation of the ball screws 31a and 31b is stopped. Then, the electromagnetic brakes 33a and 33b stop the rotation of the ball screws 31a and 31b. Accordingly, the beam 40 and the upper chuck 45 are immovably fixed to the vertical frames 30a and 30b.

In this way, the rotating axes of the upper and lower chucks 25 and 45 are aligned on the same axis. Further, the positions of the upper and lower chucks 25 and 45 are aligned so that the gap between the lower rim 29 and the upper rim 49 becomes a reference width.

In a state where the upper chuck 45 is immovably fixed as described above and the upper and lower chucks 25 and 45 engage with each other, the inner space of the tire 10 nipped between the upper and lower chucks 25 and 45 is sealed.

In the sealed state, an electromagnetic valve connected to the rotary joint 28y is driven, so that external compressed air is supplied into the inner space of the tire 10 through the rotary joint 28y and the air supply hole 28x. The supply of the compressed air is stopped at the timing in which the pneumatic pressure of the tire 10 becomes a predetermined pressure.

When the supply of the compressed air is stopped, the driving of the motor 27m is started. When the motor 27m is driven, the lower spindle 27 starts to rotate, so that the plunger 28 and the lower rim 29 coaxially rotate along with the upper spindle 47 and the upper rim 49 engaging with the lower spindle 27 to thereby rotate the tire 10. At the same time, the drum 50 advances toward the tire 10 in a direction perpendicular to the conveying direction D and the horizontal direction, and presses the side surface of the tire 10 so as to apply a load to the tire 10. At this time, the drum 50 moves in a region between the pair of vertical frames 30a and 30b.

In a state where the load is applied to the tire 10 in this way, various performances of the tire 10 are measured, and various performances tests of the tire 10 end.

When various performance tests of the tire 10 end, the driving of the motor 27m is stopped, so that the rotation of the lower spindle 27 and the like is stopped. Subsequently, the electromagnetic valve which is connected to the rotary joint 28y is opened, so that the pneumatic pressure of the tire 10 decreases. Then, the electromagnetic brakes 33a and 33b are opened, so that the tire 10 is separated from the upper rim 49 by the tire stripper 48.

Subsequently, the beam 40 starts to move upward along with the upper chuck 45 and the center conveyor 3. By the upward movement of the center conveyor 3, the tire 10 is separated from the lower rim 29 and is placed on the center conveyor 3. Subsequently, the tire 10 is passed from the center conveyor 3 onto the exit conveyor 4, and an appropriate marking process is performed on the exit conveyor 4.

Here, when air is supplied into the inner space of the tire 10, the pneumatic pressure of the inner space generates a separating force as a force for separating the upper chuck 45 from the lower chuck 25.

In the tire testing device 1 according to the first embodiment, the rotating axis 45x (the vertical line passing through the center of the attachment position of the upper chuck 45 with respect to the beam 40) of the upper spindle 47 or the like of the upper chuck 45 is disposed on the straight line L passing through the support points (the points on the center axes 30x and 30y of the vertical frames 30a and 30b) in which the vertical frames 30a and 30b support the beam 40 and is disposed at a position away from the support points by the same distance. Thus, the separating force acting on the upper chuck 45 is evenly transmitted from the upper chuck 45 toward both ends of the beam 40 in the longitudinal direction. For this reason, a mechanical stress such as flexural or tension concerned with the longitudinal direction of the beam 40 is symmetrical with the upper chuck 45 interposed therebetween, and only a force of an upward vertical element acts on the upper chuck 45. Accordingly, it is possible to effectively suppress the inclination or the shift of the rotating axis of the upper chuck 45 with respect to the rotating axis of the lower chuck 25 due to the separating force.

In this way, in the tire testing device 1 according to the first embodiment, the rotating axis of the upper chuck 45 may appropriately match the rotating axis of the lower chuck 25, and hence the tire 10 may be appropriately tested.

Further, in the tire testing device 1 according to the first embodiment, the straight line L which extends in the arrangement direction of the vertical frames 30a and 30b in the longitudinal direction of the lower frame 20 forms an acute angle or an obtuse angle with respect to the conveying direction D. For this reason, the size of the tire testing device 1 in a direction perpendicular to the conveying direction D decreases when viewed from the vertical direction.

In addition, the drum 50 moves in a direction perpendicular to the conveying direction D, passes between the vertical frames 30a and 30b, and advances toward the tire 10 nipped between the upper chuck 45 and the lower chuck 25. For this reason, it is possible to prevent the interference of the vertical frames 30a and 30b with respect to the drum 50 while realizing a decrease in the size of the tire testing device 1.

Further, the linear sensor 35 detects the position of the beam 40 in the vertical direction. For this reason, it is possible to appropriately control the position of the beam 40, the position of the upper chuck 45 in the vertical direction, and the relative position between the upper chuck 45 and the lower chuck 25. Specifically, the deceleration immediately before the test position of the beam 40 may be appropriately performed. Further, the beam 40 may be appropriately decelerated immediately before the beam 40 reaches the uppermost movement position. This prevents degradation in movement speed in the entire movement range of the beam 40 and the upper chuck 45, and hence degradation in working efficiency is suppressed.

Further, the movement of the upper chuck 45 in the vertical direction is realized by the movement of the beam 40 in the vertical direction, and the ball screws 31a and 31b which move the beam 40 in the vertical direction are provided in the vertical frames 30a and 30b instead of the beam 40. For this reason, for example, compared to a case where the beam 40 is provided with a unit for moving the upper chuck 45 in the vertical direction with respect to the beam 40 so that the beam 40 is not movable with respect to the vertical frames 30a and 30b, an increase in the size of the periphery of the beam 40, that is, an increase in the height of the entire tire testing device 1 may be suppressed.

Further, the electromagnetic brakes 33a and 33b which immovably fix the beam 40 to the vertical frames 30a and 30b are provided in the vertical frames 30a and 30b instead of the beam 40. For this reason, for example, compared to a case where the beam 40 is provided with the lock mechanism for moving the upper chuck 45 in the vertical direction with respect to the beam 40 and immovably fixing the upper chuck 45 to the beam 40 so that the beam 40 is not movable with respect to the vertical frames 30a and 30b, an increase in the height of the entire tire testing device 1 may be suppressed.

Further, the ball screws 31a and 31b are used as a unit for moving the beam 40 in the vertical direction. For this reason, the positioning operations of the beam 40 and the upper chuck 45 in the vertical direction may be performed with high precision. In particular, the ball screws 31a and 31b are driven by the servo motors 32a and 32b. For this reason, the positioning precision is improved.

Further, the respective ball screws 31a and 31b are provided with the electromagnetic brakes 33a and 33b prohibiting the rotation of the ball screws 31a and 31b, and the movement of the beam 40 is prohibited by prohibiting the rotation of the ball screws 31a and 31b. For this reason, for example, compared to a case where the beam 40 is directly fixed to the vertical frames 30a and 30b, the structure is simplified.

Further, the respective ball screws 31a and 31b are driven by the different motors 32a and 32b in a synchronization state. For this reason, compared to a case where a mechanism for transmitting the driving force from one motor to the respective ball screws 31a and 31b is employed, the structure is simplified.

Further, the linear motion guides 34a and 34b which guide the movement of the beam 40 are attached to the vertical frames 30a and 30b. For this reason, the smooth movement of the beam 40 is realized.

Further, the final alignment of the upper and lower chucks 25 and 45 is performed by the plunger 28 of the lower chuck 25. Thus, it is not necessary to provide the plunger in the upper chuck 45 and the actuator for driving the plunger, and hence to simplify the configuration of the upper chuck 45 and to decrease the weight thereof. In particular, since a decrease in the weight of the upper chuck 45 is important when moving the beam 40 holding the upper chuck 45 in the vertical direction as in the first embodiment, the configuration is effective. Further, since the configuration of the upper chuck 45 is simplified, an increase in the height of the upper chuck 45 may be suppressed, and an increase in the height of the entire tire testing device 1 may be suppressed.

Further, the plunger 28 of the lower chuck 25 is provided with the tapered convex portion 28p, and the upper spindle 47 is provided with the concave portion 47p engaging with the convex portion 28p. For this reason, compared to a case where the plunger 28 is provided with the concave portion and the upper spindle 47 is provided with the convex portion, the configuration of the plunger 28 may be simplified and the weight thereof may be decreased while realizing the engagement between the upper and lower chucks 25 and 45. Due to the simplified configuration and the light weight, the manufacturing workability may be improved and the cost may be decreased.

Further, the position of the plunger 28 in the vertical direction is detected by the linear sensor 28d. For this reason, the position of the plunger 28 and the relative position between the upper chuck 45 and the lower chuck 25 in the vertical direction may be set as appropriate positions.

In particular, the plunger 28 is operated after the engagement between the lower chuck 25 and the upper chuck 45, that is, the plunger 28 and the upper spindle 47, so that the final alignment between the lower chuck 25 and the upper chuck 45 is performed. For this reason, the positioning precision of the lower chuck 25 and the upper chuck 45 may be further improved.

Here, in the first embodiment, a case has been described in which the beam 40 is moved downward from the standby position to the test position and the supply of compressed air to the inner space of the tire 10 is started, but the compressed air supply procedure is not limited thereto.

For example, the tire 10 is conveyed to the tire testing device 1 while being laid laterally (a state where the side wall follows the horizontal plane). For this reason, when the strength of the side wall is low, the side wall positioned at the upper side is warped and the bead portion of the tire positioned at the front end of the side wall droops, so that the bead width may become smaller than the reference width. In this case, even when the beam 40 is moved downward to the test position, the upper rim 49 does not contact the tire 10, and the compressed air supplied to the inner space of the tire 10 escapes to the outside, so that there is a concern that the pneumatic pressure of the tire 10 may not be set to a predetermined pressure.

Therefore, the following control may be performed in order to reduce this problem.

First, the beam 40 is moved downward to a position (a position lower than the test position by, for example, about 25 mm) where the upper rim 49 contacts the bead of the tire 10. At the same time when the beam 40 moves downward, the plunger 28 is stretched upward so that the plunger 28 engage with the upper spindle 47. Then, the beam 40 and the upper chuck 45 are fixed by the electromagnetic brakes 33a and 33b at a position where the upper rim 49 contacts the bead of the tire 10 (the first position control).

Subsequently, compressed air is supplied to the inner space of the tire 10. At this time, the pneumatic pressure of the inner space of the tire 10 is set to the pneumatic pressure lower than that of the test (the first pneumatic control).

By the first position control and the first pneumatic control, the tire 10 expands by the supply of the compressed air while maintaining the contact between the bead and the upper rim 49.

Subsequently, the beam 40 and the upper chuck 45 are slightly moved upward while maintaining the contact between the bead and the upper rim 49, so that the beam 40 is returned to the test position. Accordingly, the gap between the lower rim 29 and the upper rim 49 becomes the reference width. Next, the beam 40 and the upper chuck 45 are fixed by the electromagnetic brakes 33a and 33b (the second position control).

Then, compressed air is supplied to the inner space so that the pneumatic pressure of the inner space of the tire 10 is set to the pneumatic pressure at the test (the second pneumatic control).

Subsequently, various performance tests are performed while rotating the tire 10.

When such controls are performed, compressed air may be supplied to the inner space of the tire 10 while the upper rim 49 reliably contacts the bead of the tire 10, and hence the test of the tire 10 may be appropriately performed.

(Second Embodiment)

Figure 4:
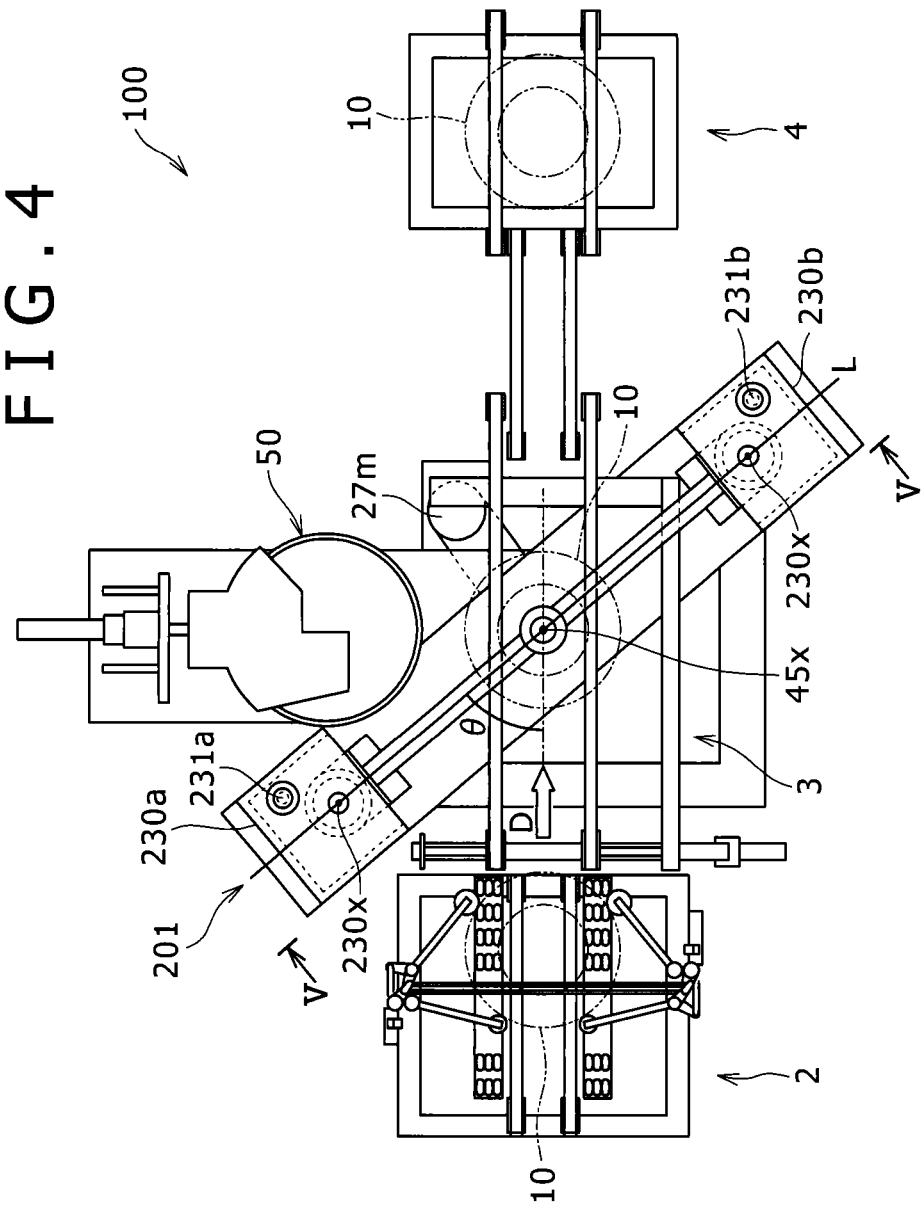
[FIG. 4] is a plan view illustrating an entire tire testing system which includes a tire testing device according to a second embodiment of the invention.
Figure 5:
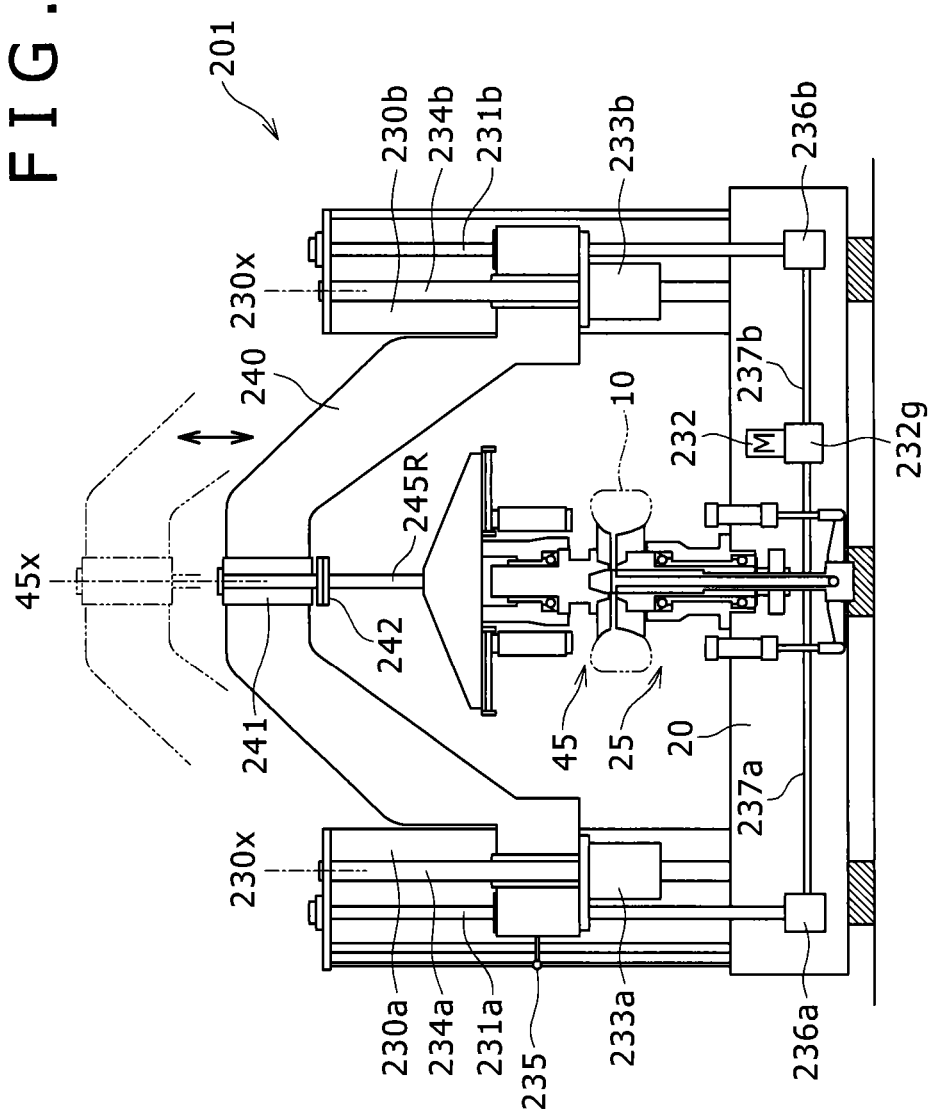
[FIG. 5] is a side view of the tire testing device according to the second embodiment of the invention when viewed from a plane taken along line V-V of FIG. 4.

Referring to FIGS. 4 and 5, a tire testing device 201 according to a second embodiment of the invention will be described. Furthermore, the same reference numerals will be given to the same components as the above-described components, and the description thereof will not be repeated. The tire testing device 201 has substantially the same configuration as that of the tire testing device 1 of the first embodiment except for the following points.

A beam 240 is not formed in a linear shape extending in the horizontal direction as a whole, but is formed in a shape of which the center in the longitudinal direction protrudes upward. Specifically, the beam 240 includes a linear horizontal portion which extends in the horizontal direction at the center in the longitudinal direction and two inclined portions which respectively inclined downward obliquely from both ends of the horizontal portion in the longitudinal direction.

Both ends (that is, the opposite ends to the horizontal portion in two inclined portions) of the beam 240 in the longitudinal direction are positioned at the lower side in relation to the center of the beam 240 in the longitudinal direction.

Both ends of the beam 240 in the longitudinal direction are guided by guide rails 234a and 234b of vertical frames 230a and 230b. Further, both ends of the beam 240 in the longitudinal direction are connected to ball screws 231a and 231b provided in the vertical frames 230a and 230b. Thus, since both ends of the beam 240 in the longitudinal direction are positioned at the lower side in relation to the center in the longitudinal direction, an increase in the height of the vertical frames 230a and 230b may be suppressed, and an increase in the height of the entire tire testing device 201 may be suppressed.

The vertical frames 230a and 230b are respectively attached with the bar-like guide rails 234a and 234b. The guide rails 234a and 234b are formed in a columnar shape or a cylindrical shape instead of a prismatic shape, and are made by, for example, a circular steel pipe. In the tire testing device 1 according to the second embodiment, the guide rails 234a and 234b serve as guide members that guide the movement of the beam 240 along the vertical frames 230a and 230b in the vertical direction. Further, the guide rails 234a and 234b reinforce the support force of the beam 240 by the vertical frames 230a and 230b.

Both ends of the beam 240 in the longitudinal direction are respectively attached with guide bushes and lock units 233a and 233b.

The guide rails 234a and 234b are inserted into the guide bushes, and the guide bushes slide along the guide rails 234a and 234b in the vertical direction. In this way, since the guide bushes are guided by the guide rails 234a and 234b, the beam 240 is guided in the vertical direction.

The lock units 233a and 233b include mechanisms which grip the guide rails 234a and 234b from the outer peripheries thereof. Each of the lock units 233a and 233b includes a wedge sleeve and a clamp ring provided therein. The lock units 233a and 233b immovably fix the beam 240 to the guide rails 234a and 234b, so that the beam 240 is immovably fixed to the vertical frames 230a and 230b. In this way, in the tire testing device 201 according to the second embodiment, the lock units 233a and 233b prohibit the movement of the beam 240 in the vertical direction and the relative movement of the upper and lower chucks 25 and 45 due to the separating force.

In the inner spaces of the vertical frames 230a and 230b, the ball screws 231a and 231b for moving the beam 240 in the vertical direction are disposed. In the tire testing device 1 according to the second embodiment, the ball screws 231a and 231b are connected to each other by drive shafts (connection members) 237a and 237b extending in the horizontal direction.

The drive shafts 237a and 237b are respectively connected to the ball screws 231a and 231b through gear boxes 236a and 236b provided in the lower ends of the ball screws 231a and 231b. Further, the drive shafts 237a and 237b are connected to each other through a gear box 232g. The gear box 232g is provided with a motor 232, and the drive shafts 237a and 237b are rotationally driven by the motor 232 through the gear box 232g. The rotation of the drive shafts 237a and 237b is transmitted to the ball screws 231a and 231b through the gear boxes 236a and 236b, and the ball screws 231a and 231b rotate with the rotation of the drive shafts 237a and 237b.

The vertical frame 230a is provided with a linear sensor 235. The linear sensor 235 detects the position of the beam 240 in the vertical direction.

A rod 245R which extends in the vertical direction is attached to the center of the beam 240 in the longitudinal direction. The upper chuck 45 is attached to the lower end of the rod 245R. That is, the upper chuck 45 is attached to the center of the beam 240 in the longitudinal direction through the rod 245R.

In the tire testing device 201 according to the second embodiment, the upper chuck 45 is not movable with respect to the beam 240, but is movable in the vertical direction. Specifically, a slide (upper chuck holding member) 241 which holds the rod 245R and the upper chuck 45 in a slidable manner in the vertical direction is provided in the center of the beam 240 in the longitudinal direction. The lower end of the slide 241 is provided with a stopper 242 which limits the upper limit of the relative movement range of the upper chuck 45 with respect to the beam 240. The upper-limit position of the upper chuck 45 specified by the stopper 242 is a position in which the gap between the lower rim 29 and the upper rim 49 becomes the reference width. The solid line of FIG. 5 indicates a state where the upper chuck 45 is disposed at the lower-limit position with respect to the beam 240. The relative movement range of the upper chuck 45 with respect to the beam 240 is, for example, 25 mm. This range may be set in response to the width or the like of the tire 10.

The upper chuck 45 is disposed at the lower-limit position with respect to the beam 240 by the gravity of the upper chuck 45 or the force of the actuator (for example, a hydraulic cylinder or the like not illustrated) that moves the upper chuck 45 in the vertical direction with respect to the beam 240 other than the case where the upper chuck chucks the tire 10 together with the lower chuck 25. That is, the upper chuck 45 is disposed at the lower-limit position even during the time in which the beam 240 starts to move downward from the standby position at the same time when the center conveyor 3 starts to move downward.

Next, a method of testing the tire 10 using the tire testing device 201 according to the second embodiment will be described.

First, the beam 240 moves downward from the uppermost movement position as the standby position to a position (a position lower than the test position by, for example, 25 mm) where the upper rim 49 contacts the bead of the tire 10 while the upper chuck 45 is held at the lower-limit position. The lock units 233a and 233b immovably fix the beam 240 with respect to the vertical frames 230a and 230b at the position (the third position control).

Subsequently, compressed air is supplied to the inner space of the tire 10 so that the pneumatic pressure is lower than the pneumatic pressure at the test (the third pneumatic control). Here, in the tire testing device 201 according to the second embodiment, the upper chuck 45 is relatively movable in the vertical direction with respect to the beam 240. For this reason, as the compressed air is supplied to the inner space of the tire 10, the upper chuck 45 moves upward relatively in the vertical direction with respect to the beam 240 while maintaining the contact between the bead and the upper rim 49. The upper chuck 45 stops at a position where the upper chuck contacts the stopper 242, that is, the upper-limit position. Accordingly, the gap between the lower chuck 25 (specifically, the lower rim) and the upper chuck 45 (specifically, the upper rim) becomes the reference width.

Subsequently, the plunger 28 engages with the upper spindle 47, so that compressed air is supplied to the inner space of the tire 10 so that the pneumatic pressure becomes the pneumatic pressure at the test (the fourth pneumatic control). Then, various performance tests are performed while rotating the tire 10.

Here, as in the first embodiment, even in the tire testing device 201 according to the second embodiment, as illustrated in FIG. 4, the points where the beam 240 is supported by the respective vertical frames 230a and 230b, that is, the points on the center axes 230x and 230y of the respective vertical frames 230a and 230b are positioned on the same straight line L as that of the rotating axis 45x of the upper chuck 45 when viewed from the vertical direction and are away from the point on the rotating axis 45x by the same distance.

Thus, the separating force acting on the upper chuck 45 is evenly transmitted from the upper chuck 45 toward both ends of the beam 240 in the longitudinal direction. Thus, a mechanical stress such as flexural or tension concerned with the longitudinal direction of the beam 240 is symmetrical with the upper chuck 45 interposed therebetween, and only the separating force of the upward vertical element acts on the upper chuck 45. Accordingly, it is possible to effectively suppress the shift of the rotating axis of the upper chuck 45 with respect to the rotating axis of the lower chuck 25 due to the separating force.

Further, the guide rails 234a and 234b which guide the movement of the beam 240 are attached to the vertical frames 230a and 230b. For this reason, the stable movement of the beam 240 is realized.

In addition, in the second embodiment, the same effect may be obtained by the same configuration as that of the first embodiment. Further, the second embodiment may obtain the following effect by a configuration different from that of the first embodiment.

The pair of ball screws 231a and 231b is connected to each other by the drive shafts 237a and 237b, and is driven in a synchronization state by one motor 232. For this reason, the synchronized driving of the ball screws 231a and 231b is performed with high precision.

Further, the third position control, the third pneumatic control, and the fourth pneumatic control are performed, and compressed air is supplied to the inner space of the tire 10 while the upper rim 49 contacts the tire 10. For this reason, for example, even when the strength of the side wall is low, the pneumatic pressure of the tire 10 may be set to an appropriate pressure, and the test of the tire 10 may be appropriately performed. In particular, in the second embodiment, the slide 241 holds the upper chuck 45 in a slidable manner in the vertical direction, and the upper chuck 45 slides upward in response to the pneumatic pressure of the air supplied to the inner space of the tire 10 during the third pneumatic control. For this reason, there is no need to provide a drive unit for moving the upper chuck 45 in response to the pneumatic pressure, and hence the structure may be simplified. Even when the strength of the side wall of the tire 10 is low, the tire 10 may be appropriately tested.

Furthermore, in a case where an actuator for moving the upper chuck 45 in the vertical direction with respect to the beam 240 is used and the upper chuck 45 is disposed at the lower-limit position by the actuator, it is desirable to perform the following control. That is, when performing the first pneumatic control, it is desirable that the downward vertical force smaller than the separating force acting on the upper chuck 45 by the compressed air supplied to the upper chuck 45 act on the upper chuck 45 by the actuator. With such a configuration, when performing the first pneumatic control, it is prevented that the upper chuck 45 vigorously moves upward to violently collide with the stopper 242 with the supply of the compressed air while expanding the tire 10.

Here, in the second embodiment, the guide rails 234a and 234b are increased in diameter so as to have a large strength, so that the guide rails 234a and 234b may serve as the vertical frames for supporting the beam 240.

Further, in the second embodiment, the lock units 233a and 233b may not be provided, and the drive shafts 237a and 237b may be provided with a brake unit (a disk brake or an electromagnetic brake) for stopping the rotation of the ball screws 231a and 231b.

Further, in the second embodiment, the connection member connecting the pair of ball screws 231a and 231b to each other is not limited to the drive shafts 237a and 237b, and various other members (for example, a drive belt) may be employed.

Further, in the second embodiment, a spacer which is made by, for example, a plate member may be provided between the lower surface of the slide 241 and the stopper 242 so as to adjust the upper limit of the movable range of the upper chuck 45.

(Third Embodiment)

Figure 6:
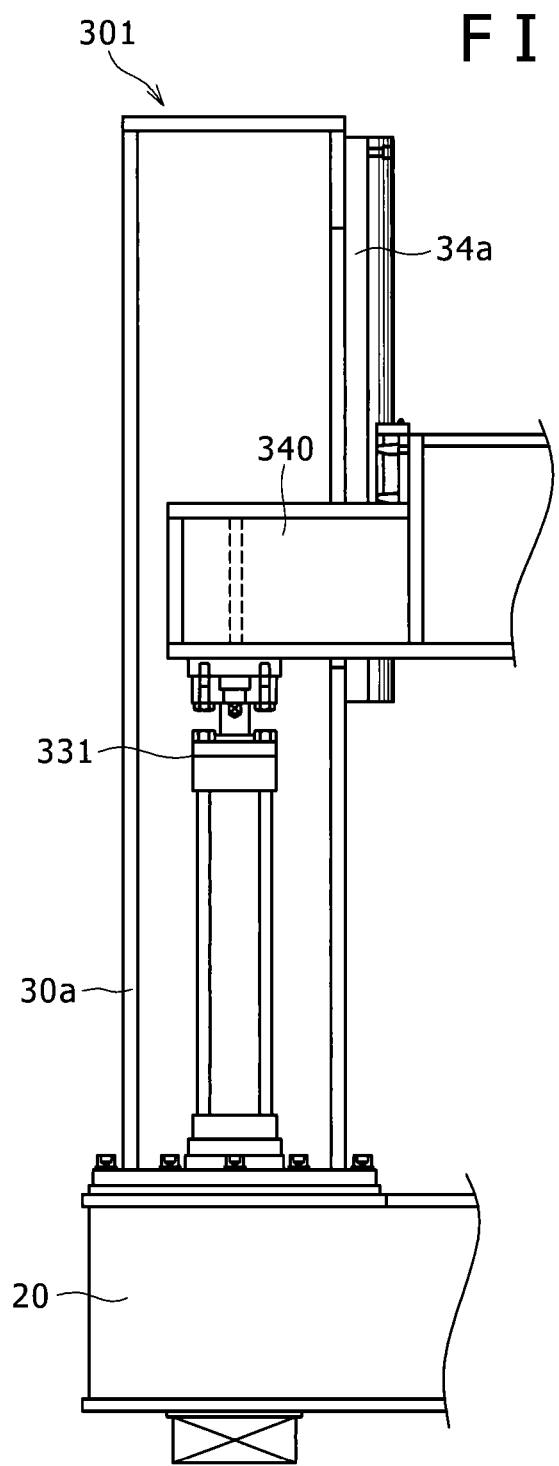
[FIG. 6] is a partial side view of a tire testing device according to a third embodiment of the invention.

Next, a tire testing device 301 according to a third embodiment of the invention will be described by referring to FIG. 6. Furthermore, the same reference numerals will be given to the same components as the above-described components, and the description thereof will not be repeated. The tire testing device 301 has substantially the same configuration as that of the tire testing device 1 of the first embodiment except for the following points.

In the tire testing device 301 according to the third embodiment, the ball screws 31a and 31b, the motors 32a and 32b, and the electromagnetic brakes 33a and 33b are provided inside the vertical frames 30a and 30b (in FIG. 6, only one vertical frame 30a is illustrated) as not in the first embodiment. Meanwhile, hydraulic cylinders 331 and 331 each including a piston and a piston rod are provided inside the vertical frames 30a and 30b.

The hydraulic cylinders 331 and 331 extend in the vertical direction inside the respective inner spaces of the vertical frames 30a and 30b. The hydraulic cylinders 331 and 331 support both ends of the beam 340 in the longitudinal direction from the lower side thereof. Each end of the beam 340 in the longitudinal direction is fixed to the front end of the piston rod of each hydraulic cylinder 331. In response to the movement of the pistons of the hydraulic cylinders 331 and 331, the beam 340 moves along the vertical frames 30a and 30b in the vertical direction. When the piston stops, the beam 340 is immovably fixed to the vertical frames 30a and 30b in the vertical direction. Furthermore, the beam 340 is supported by the vertical frames 30a and 30b through the hydraulic cylinders 331 and 331 and the linear motion guides 34a and 34b.

In the tire testing device 301 according to the third embodiment, the hydraulic cylinders 331 and 331 are used as the fixing unit of the beam 340 and the beam moving unit for moving the beam 340 in the vertical direction. For this reason, compared to a case where the beam moving unit and the fixing unit are individually provided, the configuration of the entire device is simplified.

Furthermore, when a linear sensor equipped with a hydraulic cylinder is used as a unit for detecting the positions of the beam 340 and the upper chuck, the configuration of the device may be further simplified compared to a case where a position detecting unit is separately attached.

Here, in the tire testing device 301 according to the third embodiment, the hydraulic cylinders 331 and 331 may serve as the vertical frames 30a and 30b. That is, both ends of the beam 340 may be respectively supported by the hydraulic cylinders 331 and 331. In this case, the linear motion guides 34a and 34b may not be provided.

With such a configuration, the configuration of the entire device may be further simplified.

(Fourth Embodiment)

Figure 7:
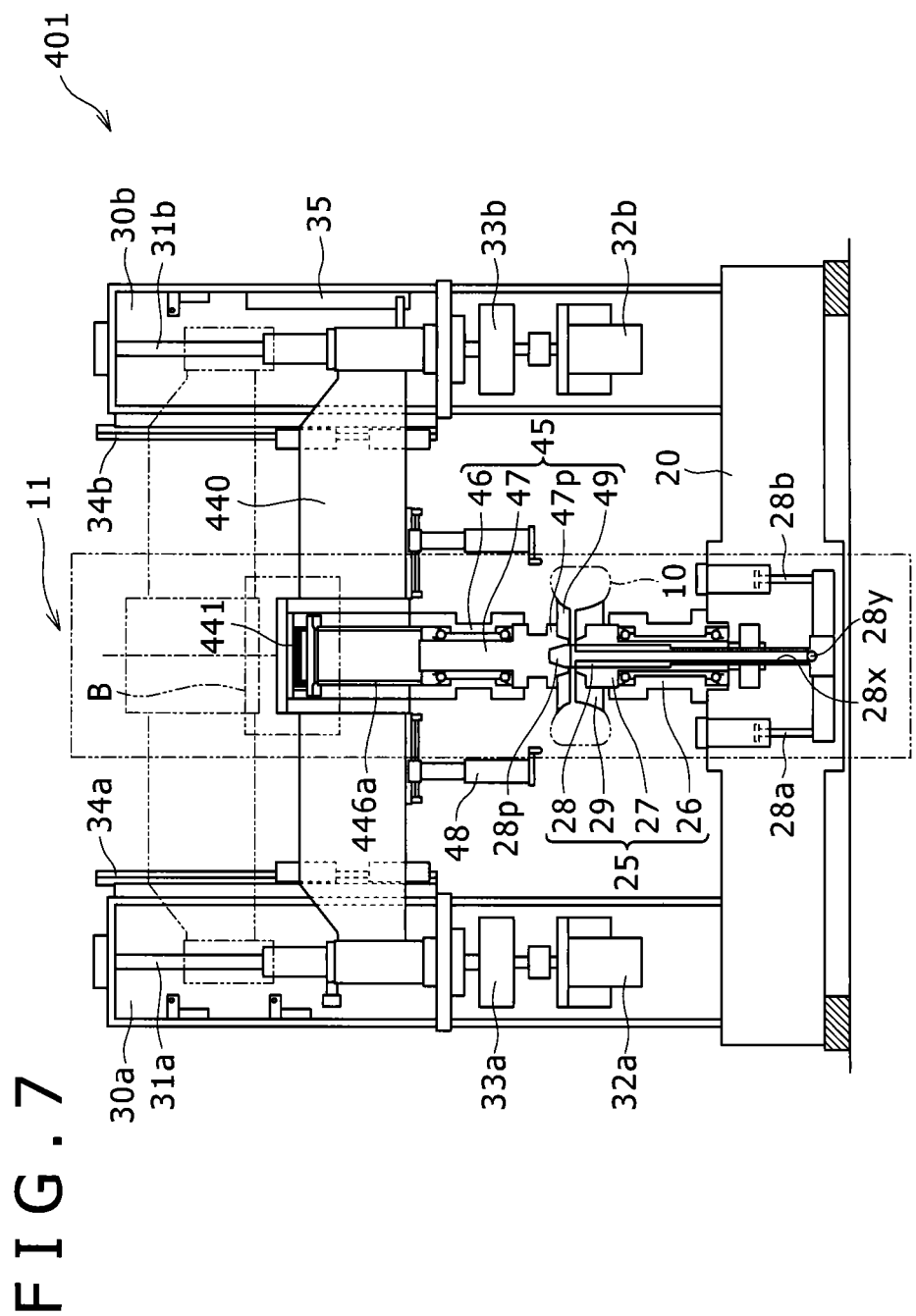
[FIG. 7] is a side view illustrating a tire testing device according to a fourth embodiment of the invention.

Referring to FIG. 7 and the like, a tire testing device 401 according to a fourth embodiment of the invention will be described. Furthermore, the same reference numerals will be given to the same components as the above-described components, and the description thereof will not be repeated. The tire testing device 401 according to the fourth embodiment further includes an axis adjusting unit which may adjust the axis of the upper spindle 47 with respect to the tire testing device 1 of the first embodiment. The specific configuration according to the axis adjusting unit will be described below.

Figure 8:
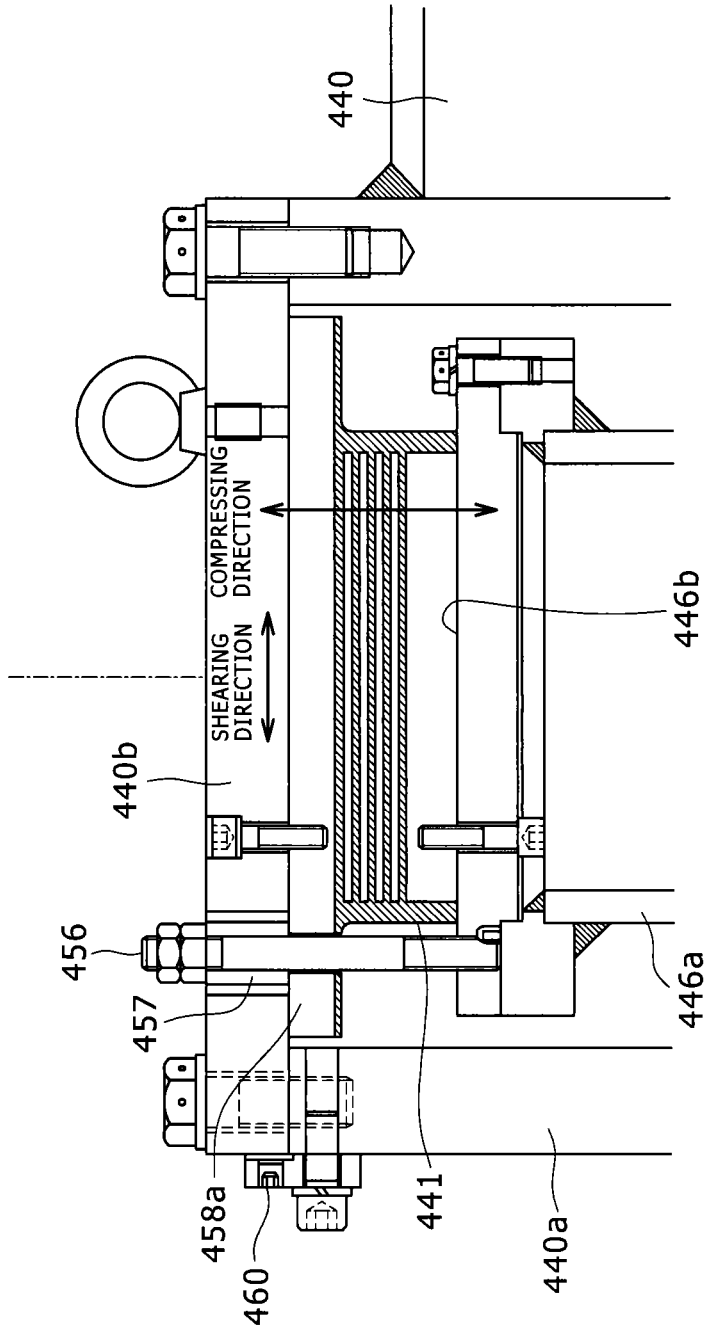
[FIG. 8] is an enlarged view of a main part B of FIG. 7.

As illustrated in FIG. 8 as an enlarged view of a main part B of FIG. 7, the tire testing device 401 includes a laminated rubber support 441 as the axis adjusting unit. A beam 440 includes a cylindrical portion 440a and a cover member 440b fixed to the cylindrical portion 440a. The cylindrical portion 440a is a cylindrical member that extends in the up to down direction, and accommodates an upper portion 446a of the upper spindle housing 46 therein. The cover member 440b blocks the upper opening of the cylindrical portion 440a. The laminated rubber support 441 is interposed between the cover member 440b and the upper portion 446a of the upper spindle housing 46. The laminated rubber support 441 is fixed to the upper portion 446a of the upper spindle housing 46, and the upper portion 446a of the upper spindle housing 46 is attached to the cover member 440b through the laminated rubber support 441. The upper spindle 47 is accommodated and fixed into the lower portion of the upper spindle housing 46. That is, the upper spindle 47 is connected to the laminated rubber support 441 through the upper spindle housing 46. In the fourth embodiment, the rotating axis of the upper spindle 47 matches the axis of the upper spindle housing 46.

As illustrated in FIG. 8, the laminated rubber support 441 is formed in a manner such that a plurality of thin rubber sheets and a plurality of steel plates are alternately laminated and the laminated structure is coated by rubber. These steel plates restrain the deformation of the rubber in a direction (hereinafter, the lamination direction is appropriately referred to as a compressing direction) which is the arrangement direction, that is, the lamination direction and in which the adjacent steel plates approach each other. For this reason, the spring constant of the laminated rubber support 441 with respect to the compressing direction is large, and the steel plates are not easily deformed by a load (hereinafter, appropriately referred to as a compressing load) applied in the compressing direction.

Meanwhile, the spring constant of the laminated rubber support 441 in a direction (hereinafter, the direction is appropriately referred to as a shearing direction) which is perpendicular to the compressing direction and in which the adjacent steel plates separate from each other is small, and the laminated rubber support is comparatively easily deformed in the shearing direction. Further, the spring constant of the laminated rubber support 441 with respect to the force for inclining the laminated rubber support 441 with respect to the shearing direction is small, and the laminated rubber support is comparatively easily deformed in this direction. That is, the laminated rubber support 441 may easily oscillate in the compressing direction so that the surface (and the cross-section) extending in the shearing direction is inclined with respect to the shearing direction. As an example of the laminated rubber support 441, a seismic isolation rubber support which is used for the seismic isolation of the construction may be exemplified.

The laminated rubber support 441 is fixed between the cover member 440b and the upper portion 446a of the upper spindle housing 46 while the compressing direction becomes the up to down direction of the tire testing device 1. Specifically, the upper spindle housing 46 includes an upper end surface 446b which extends in the horizontal direction. The laminated rubber support 441 includes a lower surface which contacts the upper end surface 446b. The laminated rubber support 441 is fixed while the upper end surface 446b and the lower surface contact each other. The axis of the laminated rubber support 441 extending in the up to down direction substantially matches the rotating axis of the upper spindle housing 46 and the axis of the upper spindle 47.

In accordance with the arrangement, the spring constant of the laminated rubber support 441 with respect to the upward force increases. Meanwhile, the spring constant of the laminated rubber support 441 with respect to the horizontal force and the spring constant of the laminated rubber support 441 in a direction in which the laminated rubber support 441 is inclined with respect to the horizontal direction, that is, the spring constant in a direction causing the laminated rubber support 441 to be oscillated in the vertical direction decrease.

Thus, when a force is applied to the upper spindle 47 in the up to down direction, the upper spindle 47 and the upper spindle housing 46 receive a high drag force of the laminated rubber support 441, and is not movable with respect to the cover member 440b and the beam 440 in the up to down direction. Meanwhile, when a force is applied to the upper spindle 47 in the horizontal direction, the upper spindle 47, the upper spindle housing 46, and the rotating axis of the upper spindle 47 easily move with respect to the cover member 440b and the beam 440 in the horizontal direction while causing the deformation of the laminated rubber support 441 in the horizontal direction. Further, when a force of causing the upper spindle 47 to be oscillated in the horizontal direction is applied to the upper spindle 47, the upper spindle 47, the upper spindle housing 46, and the rotating axis of the upper spindle 47 are easily oscillated with respect to the cover member 440b and the beam 440 in the horizontal direction while causing the oscillation of the laminated rubber support 441 in the vertical direction, that is, inclining the laminated rubber support 441 in the horizontal direction.

As described above, in the tire testing device 401 according to the fourth embodiment, the movement of the upper spindle 47 in the up to down direction is regulated by the laminated rubber support 441, and the horizontal displacement and the horizontal oscillation of the rotating axis of the upper spindle 47 are permitted. For this reason, the axis of the upper spindle 47 may reliably match the axis of the lower spindle 27 while an appropriate pneumatic pressure may be supplied to the tire 10.

Specifically, in a case where the rotating axes of the upper spindle 47 and the plunger 28 do not match each other (the rotating axes are shifted from each other in the horizontal direction and the inclination degrees do not match each other), when the upper spindle 47 moves downward so that the convex portion 28p of the plunger 28 engages with the concave portion 47p of the upper spindle 47, a horizontal force applied from the inclined surface of the convex portion 28p of the plunger 28 to the inclined surface of the concave portion 47p of the upper spindle 47 becomes uneven in the circumferential direction. That is, a horizontal force is applied to the inclined surface of the concave portion 47p of the upper spindle 47 from a direction in which the rotating axes are shifted from each other. For this reason, the upper spindle 47 which receives the force is displaced and oscillated in the horizontal direction, so that the mismatching between the axes of the upper spindle 47 and the plunger 28 is solved.

Since the mismatching between the axes is solved, the whirling of the spindle axis after the engagement between the concave portion 47p of the upper spindle 47 and the convex portion 28p of the plunger 28 is suppressed to be small, and hence the measurement precision is improved. Further, it is possible to reliably prevent a problem in which a unnecessary stress acts on the upper spindle 47, the lower spindle 27, or the bearing supporting the spindle during the engagement between the lower spindle 27 and the upper spindle 47 and the life time thereof is adversely influenced.

Further, when air is supplied to the inner space of the tire 10, an upward separating force acts on the upper spindle 47. The separating force is strongly exerted in the up to down direction, but is not substantially exerted in a direction other than the up to down direction. For this reason, the upper spindle 47 does not move upward due to the drag force of the laminated rubber support 441 in the up to down direction, and the distance between the upper spindle 47 and the plunger 28 is maintained at an appropriate distance.

Furthermore, in the tire testing device 401 according to the fourth embodiment, a plurality of horizontal position adjusting bolts 460 and a plurality of inclination adjusting bolts 456 are provided so as to position the upper and lower spindles 27 and 47 in advance before the engagement therebetween. The horizontal position adjusting bolts 460 and the inclination adjusting bolts 456 will be described below.

The plurality of horizontal position adjusting bolts 460 are evenly attached to the outer periphery of the cylindrical portion 440a of the beam 440. Specifically, the respective horizontal position adjusting bolts 460 are attached to the attachment member that is attached to the outer periphery of the cylindrical portion 440a and protrudes toward the lateral side of the outer peripheral surface of the cover member 440b, and is positioned at the lateral side of the cover member 440b. The respective horizontal position adjusting bolts 460 may adjust the position of the attachment member and the horizontal position of the cover member 440b with respect to the cylindrical portion 440a. Then, the horizontal position of the upper spindle 47 fixed to the cover member 440b is adjusted by the adjustment of the position of the cover member 440b.

The respective inclination adjusting bolts 456 are evenly attached to the upper end surface 446b of the upper spindle housing 46 in the circumferential direction. Specifically, a screw portion which is formed in the lower end of each inclination adjusting bolt 456 is implanted into the upper end surface 446b of the upper spindle housing 46 while the rotation thereof is prohibited. The upper end of each inclination adjusting bolt 456 is provided with a screw portion. The upper end of the laminated rubber support 441 is provided with a rubber support upper flange 458a. Further, the upper surface of the rubber support upper flange 458a is provided with a collar 457 so that the lower end surface of the collar contacts the upper surface of the rubber support upper flange 458a. The screw portion of the upper end of each inclination adjusting bolt 456 is inserted into the penetration hole and the collar 457 provided in the rubber support upper flange 458a. A double nut at the upper side of the collar 457 is screw-connected to the screw portion of the upper end of each inclination adjusting bolt 456. In response to the screw-connection position of the double nut in the up to down direction, a distance between the upper end surface 446b of the upper spindle housing 46 and a part of the rubber support upper flange 458a and the cover member 440b along with the collar 457 into which the screw portion provided with the double nut is inserted is changed. Since the distance is adjusted in a plurality of portions of the upper end surface 446b of the upper spindle housing 46 in the circumferential direction by the respective inclination adjusting bolts 456, the inclination of the upper end surface 446b of the upper spindle housing 46 with respect to the horizontal plane and the inclination of the axis of the upper spindle housing 46 and the rotating axis of the upper spindle 47 with respect to the vertical direction are changed.

In this way, in the tire testing device 401 according to the fourth embodiment, the horizontal position of the upper spindle 47 is adjusted in advance by the respective horizontal position adjusting bolts 460 and the inclination of the rotating axis of the upper spindle 47 with respect to the vertical direction is adjusted by the respective inclination adjusting bolts 456.

Furthermore, the structures of the respective inclination adjusting bolts 456 and the double nuts are formed as below. When a load is applied to the laminated rubber support 441, a slight gap is formed between the collar 457 and the double nut, and the laminated rubber support 441 is movable in the horizontal direction.

(Fifth Embodiment)

Figure 9:
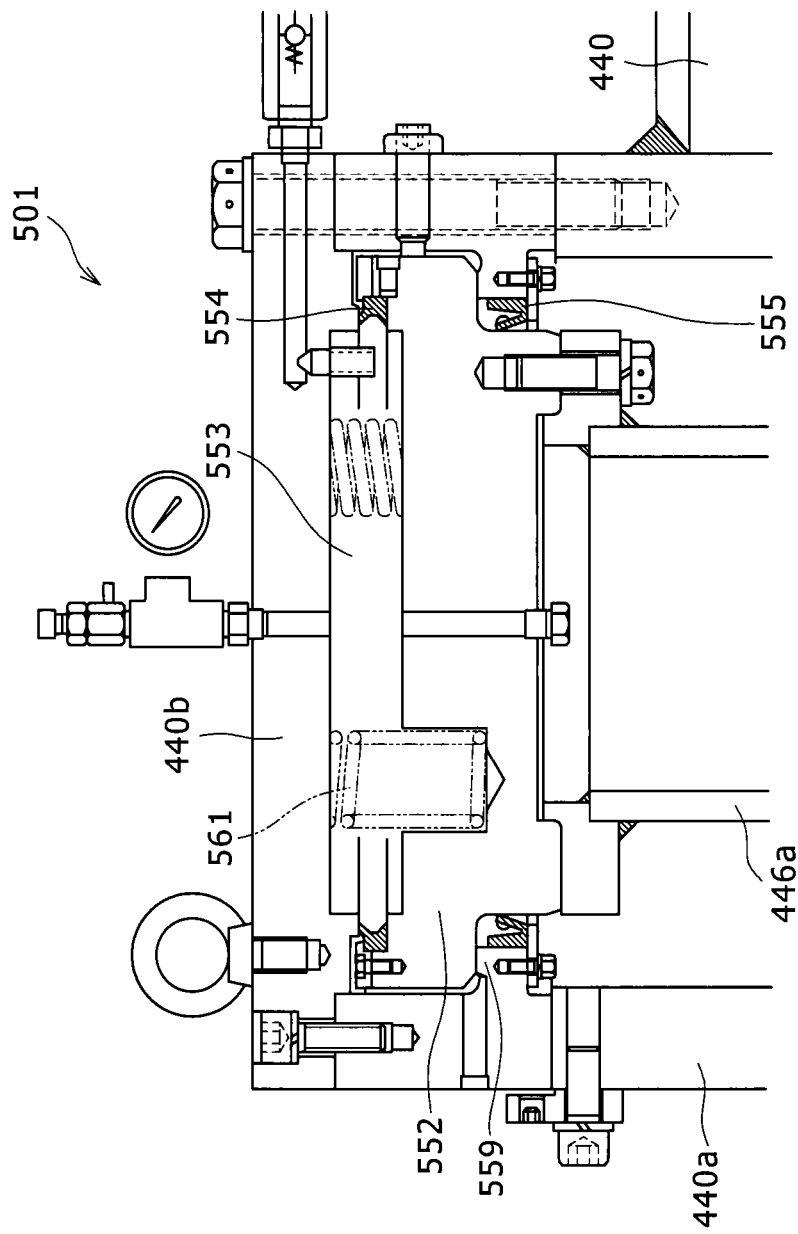
[FIG. 9] is an enlarged view of a part of a tire testing device according to a fifth embodiment of the invention.

Next, a tire testing device 501 according to a fifth embodiment of the invention will be described by referring to FIG. 9. Furthermore, the same reference numerals will be given to the same components as the above-described components, and the description thereof will not be repeated. The tire testing device 501 according to the fifth embodiment uses a unit using oil as the axis adjusting unit instead of the laminated rubber support 441.

The tire testing device 501 includes a plate 552, hydraulic oil 553, a seal 554, an oil seal 555, and a spring 561 as components of the axis adjusting unit. Here, even the cover member 440b serves as the component of the axis adjusting unit.

The plate 552 is a plate-like member that extends in the horizontal direction, and is disposed below the cover member 440b so as to be parallel to the cover member 440b. The upper portion 446a of the upper spindle housing 46 is fixed to the plate 552.

The spring 561 is interposed between the cover member 440b and the plate 552 so as to be elastically deformable, and separates these in the up to down direction.

The hydraulic oil 553 is enclosed between the cover member 440b and the plate 552. Here, the liquid enclosed between the cover member 440b and the plate 552 is not limited to the hydraulic oil 553, and may be a non-compressible liquid.

The seal 554 is formed in an annular shape. The seal 554 seals a gap between the cover member 440b and the plate 552.

The oil seal 555 is formed in an annular shape. The oil seal 555 is interposed between the cylindrical portion 440a and the plate 552. The oil seal 555 regulates the movement of the plate 552 in the horizontal direction and the direction inclined with respect to the horizontal plane.

Since the cover member 440b and the plate 552 are away from each other at the upper and lower sides so as to extend in the horizontal direction, the spring constant of the axis adjusting unit with respect to the compressing load in the up to down direction is large. Meanwhile, the axis adjusting unit is easily deformed in the horizontal direction and the direction inclined with respect to the horizontal plane by using the spring constants of the seal 554 and the oil seal 555 as the restraining force.

For this reason, even in the tire testing device 501 according to the fifth embodiment, the axis adjusting unit is used. Accordingly, the horizontal displacement and the horizontal oscillation of the rotating axes of the upper spindle housing 46 and the upper spindle 47 may be allowed while regulating the movement of the upper spindle housing 46 fixed to the plate 552 and the upper spindle 47 in the up to down direction. For this reason, the axis of the upper spindle 47 may reliably match the axis of the lower spindle 27 while an appropriate pneumatic pressure is supplied to the tire 10.

Furthermore, when compressed air is supplied to the inner space of the tire 10 and the separating force for pressing the upper spindle 47 upward is exerted, the plate 552 may be slightly raised, but may withstand the separating force. Then, the plate 552 is slightly raised, and moves away from a plate support portion 559 supporting the plate 552 so as to move horizontally.

Here, in the fifth embodiment, a plate as a plate-like member parallel to the plate 552 may be provided above the plate 552 separately from the cover member 440b, and the hydraulic oil 553 may be enclosed between the plates.

(Sixth Embodiment)

Figure 10:
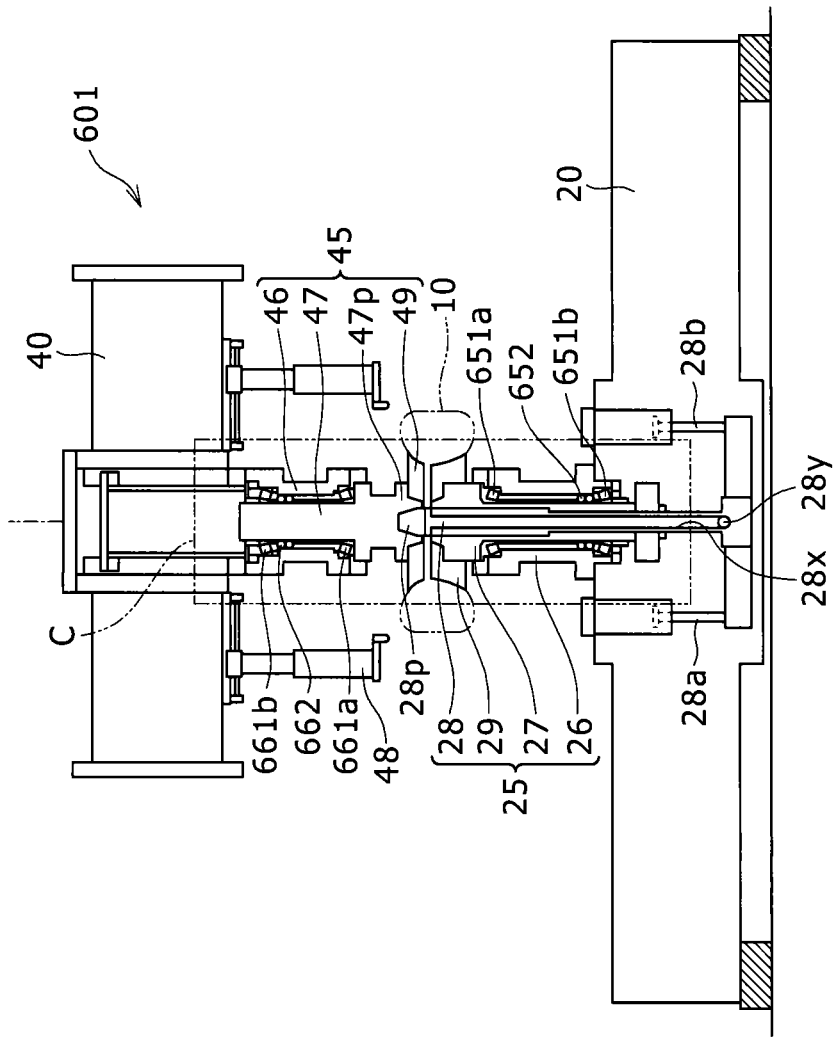
[FIG. 10] is a side view illustrating a tire testing device according to a sixth embodiment of the invention.

Referring to FIG. 10 and the like, a tire testing device 601 according to a sixth embodiment of the invention will be described. Furthermore, the same reference numerals will be given to the same components as the above-described components, and the description thereof will not be repeated.

Compared to the tire testing device 1 according to the first embodiment, the tire testing device 601 further includes two second bearings 651a and 651b, two first bearings 661a and 661b, a second roller bearing (radial bearing) 652, and a first roller bearing (radial bearing) 662.

The respective second bearings 651a and 651b and the second roller bearing (radial bearing) 652 are inserted between the lower spindle 27 and the lower spindle housing 26, and rotatably support the lower spindle 27. The respective first bearings 661a and 661b and the first roller bearing 662 are inserted between the upper spindle 47 and the upper spindle housing 46, and rotatably support the upper spindle 47.

Each of the second bearings 651a and 651b and the first bearings 661a and 661b is a so-called tapered roller bearing, and may simultaneously receive both of the axial load (a load in the rotating axis direction) of the lower spindle 27 and the upper spindle 47 and the radial load (a load in a direction perpendicular to the rotating axis direction) of the lower spindle 27 and the upper spindle 47.

Figure 11:
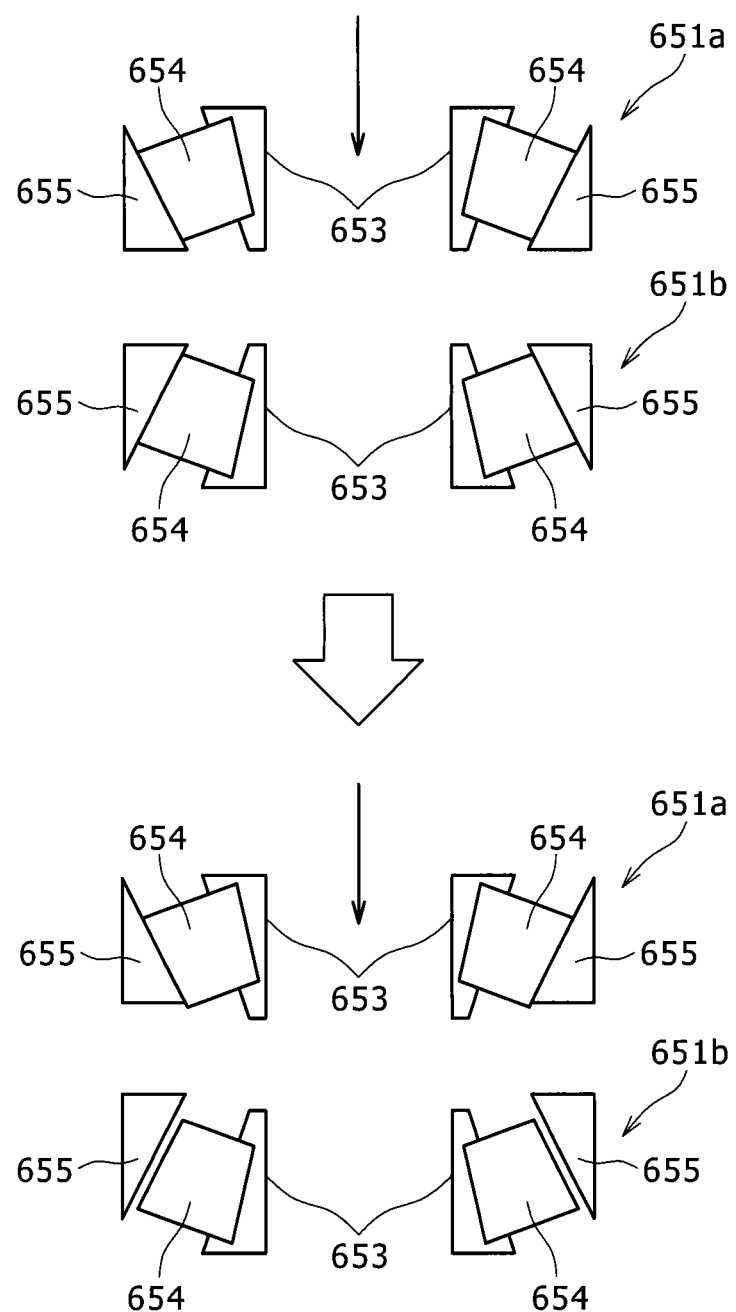
[FIG. 11] is a diagram illustrating a tapered roller bearing.

As illustrated in FIG. 11, each of the second bearings 651a and 651b and the first bearings 661a and 661b includes a cylindrical outer race (receiving portion) 655 which is positioned at the outside in the rotation radial direction and receives the load, a cylindrical inner race 653 which is positioned at the inside in the radial direction, and a plurality of tapered rollers 654 which are disposed between the races. Furthermore, FIG. 11 illustrates a change in state when a downward load of FIG. 11 is applied to the bearings 651a, 651b, 661a, and 661b, where the upper drawing in relation to the white arrow of FIG. 11 illustrates a state before the load is applied to the bearing and the lower drawing indicates a state after the separating force is applied thereto.

The inner peripheral surface of the outer race 655 and the outer peripheral surface of the inner race 653 facing each other are formed in a tapered shape, that is, a conical shape inclined in the same direction. That is, a tapered hole is formed about the axis of each of the second bearings 651a and 651b and the first bearings 661a and 661b.

The outer race 655 may receive only a load which is applied in one direction and a direction in which the inner diameter of the outer race 655 decreases among the axial loads (hereinafter, the axial direction of the tapered roller bearing is appropriately referred to as the front to rear direction, the side of the outer race 55 of which the inner diameter decreases is referred to as the front side, and the opposite side thereof is referred to as the rear side).

Specifically, when the axial load is applied in a direction in which the inner diameter of the outer race 655 decreases, that is, the front direction, the inner race 653 and the tapered roller 654 are pressed against the inner peripheral surface of the outer race 655. For this reason, the outer race 655 receives the axial load. Meanwhile, when the axial load is applied in a direction in which the inner diameter of the outer race 655 increases, that is, the rear direction, the inner race 653 and the tapered roller 654 move in a direction away from the inner peripheral surface of the outer race 655. For this reason, the outer race 655 does not receive the axial load.

Two second bearings 651a and 651b are disposed at the positions away from each other in the up to down direction while the bearings face the receivable axial load, that is, the front to rear direction and take an opposite posture.

Similarly, two first bearings 661a and 661b are disposed at the positions away from each other in the up to down direction while the bearings face the receivable axial load, that is, the front to rear direction and take an opposite posture.

In the second bearings 651a and 651b of the sixth embodiment, the front ends, that is, the ends of which the inner diameter of the outer race 655 becomes minimal are disposed so as to face each other. That is, the second bearing 651a which is positioned at the upper side and is closer to the tire 10 receives the downward axial load while the front end thereof faces the lower side. The second bearing 651b which is positioned at the lower side and is away from the tire 10 receives the upward axial load while the front end thereof faces the upper side.

Here, a downward force as a separating force is applied to the lower spindle 27. For this reason, since the second bearing 651a which receives the downward axial load is disposed at a position closer to the tire 10, the separating force is effectively received by the second bearing 651a.

The first bearings 661a and 661b of the sixth embodiment are disposed so that the front ends, that is, the ends of which the inner diameter of the outer race 655 becomes minimal face each other. That is, the first bearing 661a which is positioned at the lower side and is closer to the tire 10 receives the upward axial load while the front end thereof faces the upper side. The first bearing 661b which is positioned at the upper side and is away from the tire 10 receives the downward axial load while the front end thereof faces the lower side.

Here, an upward force as a separating force is applied to the upper spindle 47. For this reason, since the first bearing 661a which received the upward axial load is disposed at a position closer to the tire 10, the separating force is effectively received by the first bearing 661a.

Figure 12:
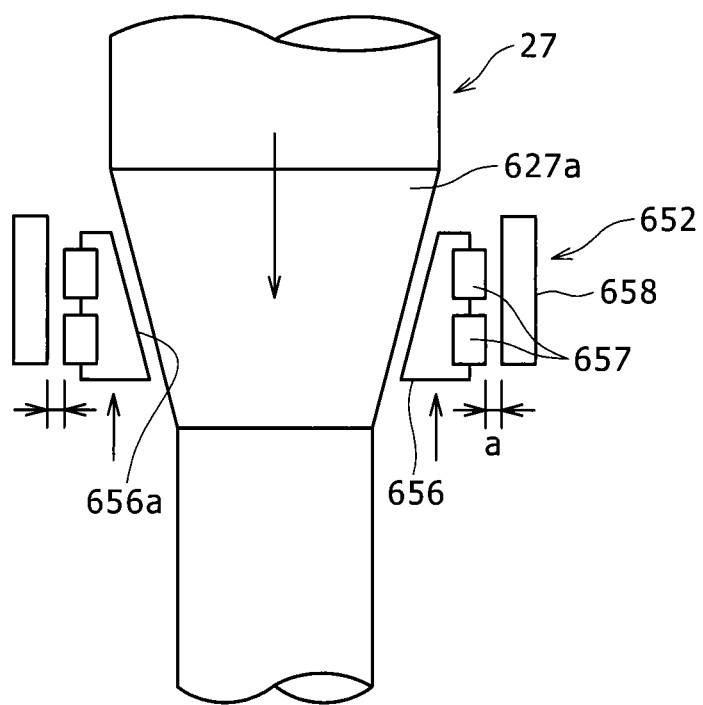
[FIG. 12] is a diagram illustrating a double-row cylindrical roller bearing.

The first roller bearing 662 and the second roller bearing 652 receive a radial load. The roller bearings 652 and 662 are so-called double-row cylindrical roller bearings. An enlarged view of the vicinity of the second roller bearing 652 is illustrated in FIG. 12. The first roller bearing 662 has the same structure as that of the second roller bearing 652. Here, only the specific structure of the first roller bearing 662 will be described.

Each second roller bearing 652 includes a cylindrical outer race 658 which is positioned at the outside in the radial direction, a cylindrical inner race 656 which is positioned at the inside in the radial direction, and a plurality of cylindrical rollers (rollers and rolling elements) 657 which are disposed between the races.

The rollers 657 are arranged in the circumferential direction of the roller bearing 652, and are arranged in two rows in the axial direction. The rollers 657 are held between the races so as to be slidable in the axial direction of the second roller bearing 652.

The inner peripheral surface of the outer race 658 and the outer peripheral surface of the inner race 656 facing each other are formed in a cylindrical surface shape which extends in parallel to the axial direction of the roller bearing 652. Meanwhile, the inner peripheral surface of the inner race 656 is formed in a tapered shape, that is, a conical surface shape. That is, a tapered hole 656a is formed about the axis of the second roller bearing 652 so that the inner diameter decreases as it moves toward one side in the axial direction.

The lower spindle 27 is provided with a tapered portion 627a which is formed in a tapered shape in a part thereof. The tapered portion 627a of the lower spindle 27 is fitted into the tapered hole 656a of the first roller bearing 652. Specifically, the tapered portion 627a of the lower spindle 27 decreases in diameter as it moves downward. The second roller bearing 652 is attached to the lower spindle 27 so as to correspond to the tapered portion 627a in a posture in which the inner diameter of the tapered hole 656a decreases as it moves downward.

Similarly, even the upper spindle 47 is provided with a tapered portion which is formed in a tapered shape in a part thereof. Then, the first roller bearing 662 is attached to the upper spindle 47 while the tapered portion is fitted into the tapered hole of the first roller bearing 662. Here, the tapered portion of the upper spindle 47 decreases in diameter as it moves upward, and the second roller bearing 652 is disposed in a direction corresponding thereto. Specifically, the first roller bearing 662 is disposed in a posture in which the inner diameter of the tapered hole decreases as it moves upward so as to correspond to the tapered portion of the upper spindle 47 which decreases in diameter as it moves upward.

Here, the radial gap a between the roller 657 and the outer race 658 of the second roller bearing 652 is set to an appropriate gap in which the lower spindle 27 reliably rotates by the adjustment of the fitting amount between the tapered portion 627*a* and the tapered hole 656*a*. Further, even in the first roller bearing 662, the gap between the outer race and the roller is set to an appropriate gap in which the upper spindle 47 reliably rotates. By the fitting of the tapered hole 656*a* and the tapered portion 627*a*, a pre-compression is applied to the double-row cylindrical roller bearing 652 when the inner race 656 slightly increases in diameter.

When a separating force acts on the lower spindle 27 in a direction indicated by the arrow of FIG. 12 and a direction in which the inner diameter of the tapered hole 656*a* decreases so that the lower spindle 27 is displaced in this direction, the inner race 656 of the second roller bearing 652 slides in the axial direction with respect to the outer race 658 along with the roller 657. Accordingly, the radial contact between the outer race 658 and the lower spindle 27 is maintained through the inner race 656, and the radial force of the lower spindle 27 is received by the second roller bearing 652. This suppresses the rotational deviation of the lower spindle 27 in the radial direction in the event of the separating force.

As illustrated in FIG. 10, the respective roller bearings 652 and 662 are disposed near the bearings 651*b* and 661*b* which do not receive the separating force among the first bearings 661*a* and 661*b* and the second bearings 651*a* and 651*b*. Specifically, the second roller bearing 652 is disposed near the upper side of the lower second bearing 651*b*. Further, the first roller bearing 662 is disposed near the lower side of the upper second bearing 661*b*.

As described above, in the bearings 651*b* and 661*b* which do not receive the separating force among the first bearings 661*a* and 661*b* and the second bearings 651*a* and 651*b*, the outer race 655, the tapered roller 654, and the inner race 653 are away from one another compared to the case where no load is generated when the separating force acts in this way. For this reason, the first bearings 661*a* and 661*b* and the second bearings 651*a* and 651*b* may not sufficiently restrain the rotational deviation of the lower spindle 27 and the upper spindle 47 in the radial direction. For this reason, there is a concern that the rotational deviation in the bearings 651*b* and 661*b* which do not receive the separating force of the lower spindle 27 and the upper spindle 47 increases only by the first bearings 661*a* and 661*b* and the second bearings 651*a* and 651*b*. However, in the embodiment, the first roller bearing 662 and the second roller bearing 652 which suppress the rotational deviation of the lower spindle 27 and the upper spindle 47 in the radial direction in the event of the separating force are disposed near the bearings 651*b* and 661*b* which do not receive the separating force. For this reason, the rotational deviation of the lower spindle 27 and the upper spindle 47 is suppressed by the roller bearings 652 and 662.

That is, even in a state where a force that may not easily restrain the rotational deviation in the radial direction due to the separating force is exerted, the lower spindle 27 is supported by the second bearing 651*a* and the second roller bearing 652 near the tire 10 in the radial direction. Accordingly, the rotational deviation in the radial direction is suppressed. Similarly, the upper spindle 47 is supported by the first bearing 661*a* and the first roller bearing 662 near the tire 10 in the radial direction. Accordingly, the rotational deviation in the radial direction is suppressed.

As described above, according to the tire testing device 601 of the sixth embodiment, the rotational deviation of the upper spindle 47 and the lower spindle 27 may be reliably suppressed, and the test of the tire 10 may be appropriately performed.

Here, the second bearings 651*a* and 651*b* and the first bearings 661*a* and 661*b* are not limited to the tapered roller bearings 651*a* and 651*b* as long as the bearing may receive the radial load and the axial load.

Further, the first roller bearing 662 and the second roller bearing 652 may be respectively provided at two or more positions in the lower spindle 27 and the upper spindle 47.

Further, the first roller bearing 662 and the second roller bearing 652 are not limited to the double-row cylindrical roller bearing. That is, the radial contact state of the bearings, the lower spindle 27, and the upper spindle 47 may be maintained in a manner such that the roller slides on the outer race in the event of the separating force. For example, a radial bearing such as a deep groove ball bearing, a cylindrical roller bearing, an angular ball bearing, a double-row angular ball bearing, a self-aligning ball bearing, or a self-aligning roller bearing may be used.

Further, the arrangement of the second bearings 651*a* and 651*b*, the first bearings 661*a* and 661*b*, the first roller bearing 662, and the second roller bearing 652 is not limited to the above-described arrangement.

Figure 13:
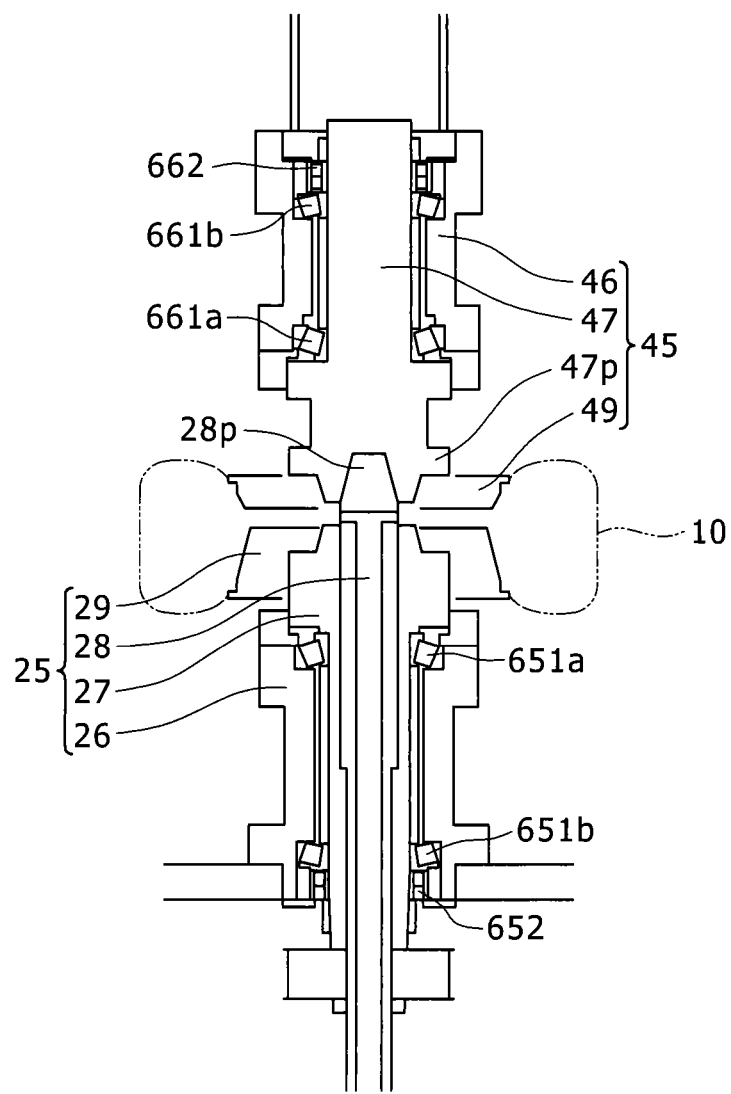
[FIG. 13] is a diagram illustrating another example of the tire testing device according to the sixth embodiment of the invention.

For example, as illustrated in FIG. 13 corresponding to the enlarged view of a main part C of FIG. 10, the second roller bearing 652 may be disposed near the lower side of the lower second bearing 651*b*, and the first roller bearing 662 may be disposed near the upper side of the upper first bearing 661*b*.

Figure 14:
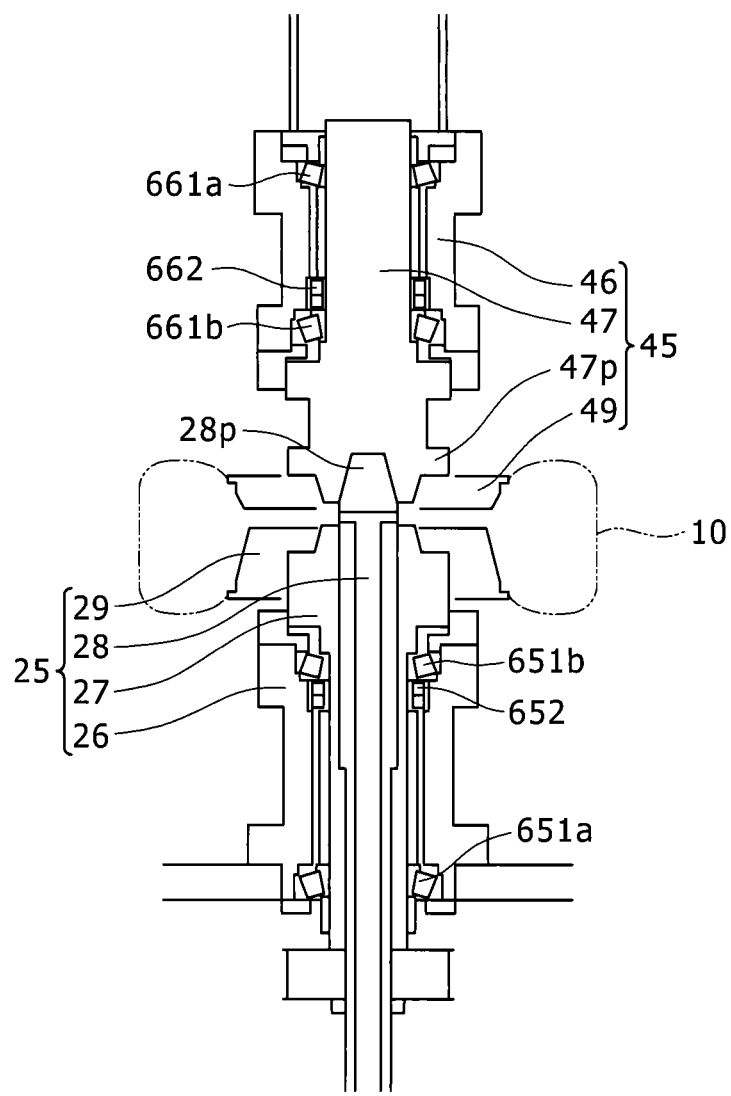
[FIG. 14] is a diagram illustrating another example of the tire testing device according to the sixth embodiment of the invention.
Figure 15:
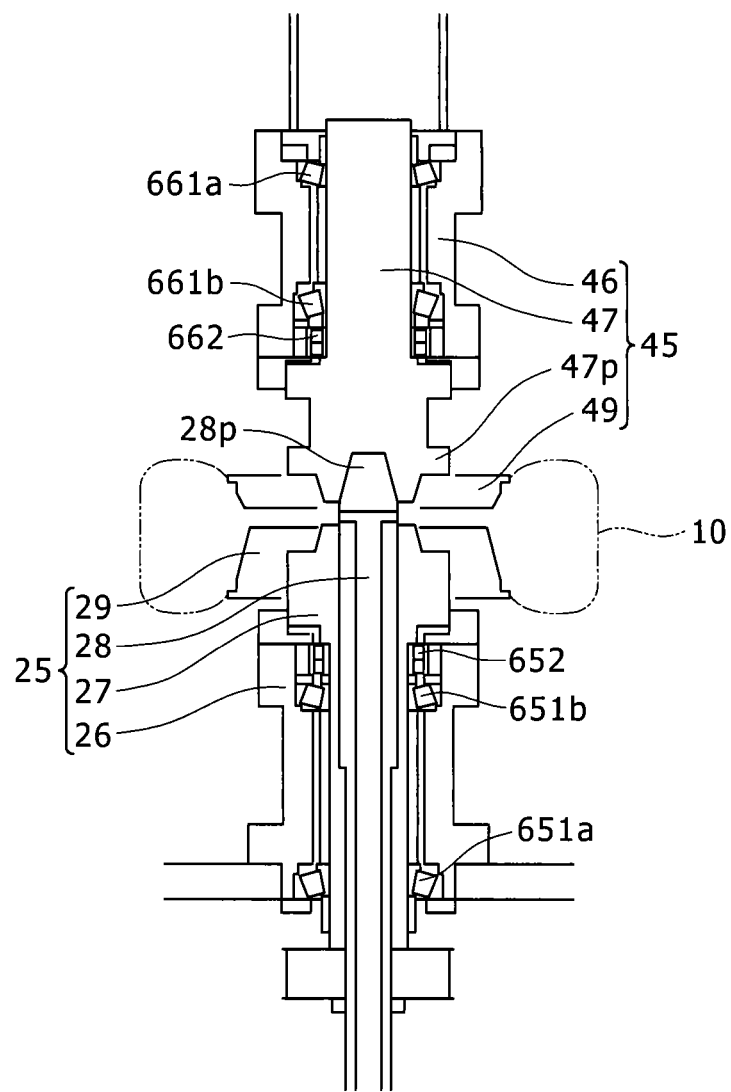
[FIG. 15] is a diagram illustrating another example of the tire testing device according to the sixth embodiment of the invention.

Further, as illustrated in FIGS. 14 and 15, the second bearings 651*a* and 651*b* supporting the lower spindle 27 may be disposed so that the rear ends (the large-inner-diameter ends) face each other. In this case, the second roller bearing 652 may be disposed in the vicinity (the upper side or the lower side) of the upper second bearing 651*b*. Further, the first bearings 661*a* and 661*b* supporting the upper spindle 47 may be disposed so that the rear ends (the large-inner-diameter ends) face each other. In this case, the first roller bearing 662 may be disposed in the vicinity (the upper side or the lower side) of the lower first bearing 661*b*.

Further, the arrangement of the first bearings 661*a* and 661*b* and the first roller bearing 662 may be set as the arrangement illustrated in FIG. 14 or 15 while the arrangement of the second bearings 651*a* and 651*b* and the second roller bearing 652 is set as the arrangement according to the sixth embodiment.

While preferred embodiments of the invention have been described, the invention is not limited to the above-described embodiments, and various modifications may be made within the limit described in the scope of claims.

For example, the configuration of the upper chuck and the lower chuck may be arbitrarily changed other than the configuration of the above-describes embodiments. Specifically, the male and female of the plunger and the upper spindle may be reversed, the plunger 28 may be provided with the concave portion, and the upper spindle may be provided with the convex portion.

Further, the guide member that guides the movement of the beam is not limited to the linear motion guide or the guide rail, and various members may be employed.

Further, the moving unit and the fixing unit are not limited to the above-described embodiments, and various other members may be employed. Further, the installation positions of the moving unit and the fixing unit are not limited to the inside of the vertical frame.

Further, the lock mechanism is not limited to the electromagnetic brake, and a disk brake, a claw (a locking claw fitted to a groove formed in a vertical frame), a mechanism obtained by inserting a pin into a circular member mounted on a ball screw, the other brakes, and various other mechanisms may be employed. Further, the lock mechanism may be provided at two positions of each of the pair of ball screws 31a and 31b. When one ball screw is provided with two lock mechanisms, one lock function may be exhibited even when one of two lock mechanisms is broken, and hence the reliability of the lock function may be improved.

Further, the movement of the beam is not limited to the vertical movement, and the beam may be immovably fixed to the vertical frame. In this case, the upper chuck may be moved in the vertical direction with respect to the beam, so that the upper chuck moves in the vertical direction.

Further, the angle θ between the straight line L and the conveying line may be 90°.

Further, the detection unit which detects the vertical position of the beam 40 and the vertical position of the upper chuck 45 and detects the relative position between the upper chuck 45 and the lower chuck 25 in the vertical direction is not limited to the linear sensor 35. For example, the encoder may be used as the detection unit by using the motors 32a and 32b as the servo motors belonging to the encoder.

Further, for example, a limit switch may be used instead of the linear sensor 35. Furthermore, it is desirable to use a detection unit which detects whether the beam approaches the lower-limit position or the upper-limit position so as to decrease the speed of the beam 40 immediately before the beam 40 reaches the lower-limit position (for example, the engagement position) or the upper-limit position.

Further, the linear sensor 28d which detects the position of the plunger 28 in the vertical direction may not be provided, and various controls may be performed by using only the detection value of the linear sensor 35. In this case, when the upper chuck 45 reaches the test position, the rotation of the ball screws 31a and 31b is stopped by the electromagnetic brakes 33a and 33b, and the beam 40 is immovably fixed in the vertical direction. At this time, the convex portion 28p of the upper end of the plunger 28 is positioned at the lower side in relation to the position illustrated in FIG. 2. Subsequently, the plunger 28 is stretched upward by the air cylinders 28a and 28b, and the convex portion 28p of the upper end of the plunger 28 engages with the concave portion 47p of the lower end of the upper spindle 47.

The method of controlling the respective components of the tire testing device according to the invention and the tire testing system during the test may be arbitrarily changed other than the example described in the above-described embodiments. For example, only when the strength of the side wall of the tire is detected and the strength is lower than a predetermined strength, a series of control including the first position control, the first pneumatic control, the second position control, and the second pneumatic control or a series of control including the third position control, the third pneumatic control, and the fourth position control which may handle the case where the strength of the side wall is low may be performed.

As described above, according to the invention, there is provided a tire testing device which tests a tire, the tire testing device including: a lower frame; a pair of vertical frames which is supported by the lower frame and respectively extends upward in the vertical direction from portions away from each other in the lower frame; a beam which is laid between the pair of vertical frames in an extending posture and is supported by the vertical frames; a lower chuck which includes a lower rotation member rotatable about the axis extending in the vertical direction and is attached to the lower frame; an upper chuck which includes an upper rotation member rotatable about the axis along the vertical direction along with the lower rotation member and is attached to the center of the beam in the longitudinal direction so as to nip the tire, conveyed to the upper side of the lower chuck, between the upper and lower chucks by the engagement therebetween while an inner space of the tire is sealed; a moving unit which moves the upper chuck in the vertical direction; a fixing unit which immovably fixes the upper chuck with respect to the vertical direction; and an air supply unit which supplies air to the inner space while the upper chuck is fixed by the fixing unit and the tire is nipped between the upper chuck and the lower chuck by sealing the inner space, in which when air is supplied to the inner space of the tire by at least the air supply unit, the rotating axis of the upper rotation member is positioned at the center of a straight line connecting support points where the respective vertical frames support the beam.

According to this device, the separating force acting on the upper chuck is evenly transmitted from the upper chuck to the support points where the respective vertical frames support the beam. For this reason, a mechanical stress such as flexural or tension concerned with the longitudinal direction of the beam is symmetrical with the upper chuck interposed therebetween, and only a force of an upward vertical element acts on the upper chuck. Thus, it is possible to effectively suppress the inclination or the shift of the rotating axis of the upper chuck with respect to the rotating axis of the lower chuck due to the separating force. This realizes the appropriate test of the tire.

In this device, the lower chuck may be positioned between the pair of vertical frames, the tire may pass between the pair of vertical frames and be conveyed to the upper side of the lower chuck, and the arrangement direction of the respective vertical frames may be inclined with respect to the tire conveying direction by an angle as an acute angle or an obtuse angle.

With such a configuration, the size of the tire testing device in a direction perpendicular to the tire conveying direction decreases when viewed from the vertical direction.

In this configuration, the device may further include a load applying member that applies a load to the tire nipped between the upper chuck and the lower chuck, in which the load applying member may pass between the pair of vertical frames in a direction perpendicular to the tire conveying direction between a position for applying a load to the tire nipped between the upper chuck and the lower chuck and a position away from the load position.

With such a configuration, the interference between the vertical frame and the drum may be prevented while realizing a decrease in the size of the tire testing device.

Further, this device may further include a chuck position detecting unit which detects a relative position between the upper chuck and the lower chuck in the vertical direction.

With such a configuration, the relative position between the upper chuck and the lower chuck may be appropriately controlled.

Further, the moving unit may include a beam moving unit which moves the upper chuck in the vertical direction by moving the beam along the pair of vertical frames in the vertical direction, and the beam moving unit may be provided in at least one of the pair of vertical frames.

With such a configuration, compared to a case where the unit for moving the upper chuck with respect to the beam in the vertical direction is provided in the beam, an increase in the size of the periphery of the beam, that is, an increase in the height of the entire tire testing device may be suppressed.

Further, in the above-described configuration, the fixing unit may include a lock mechanism which immovably fixes the upper chuck with respect to the vertical direction by immovably fixing the beam to the pair of vertical frame, and the lock mechanism may be provided in at least one of the pair of vertical frames.

With such a configuration, the periphery of the beam is further decreased in size and the height of the tire testing device may be suppressed to be low.

Further, the beam moving unit may include ball screws which are respectively provided in the pair of vertical frames and extend in the vertical direction.

With such a configuration, the beam and the upper chuck may be highly precisely positioned in the vertical direction with a simple configuration.

Further, the lock mechanism may be an electromagnetic brake which stops the rotation of the ball screw.

With such a configuration, the beam and the upper chuck may not be appropriately moved in the vertical direction with a simple configuration.

Further, the beam moving unit may further include a motor which drives each of the ball screws, and the respective motors may drive the respective ball screws in a synchronization state.

With such a configuration, the beam and the upper chuck may be stably moved with a simple configuration.

Meanwhile, the beam moving unit may further include a connection member which connects the respective ball screws to each other and motors which drive the respective ball screws in a synchronization state by the operation of the connection member.

With such a configuration, the synchronized driving of the ball screw and the movement of the beam and the upper chuck are performed with high precision.

Further, the device may further include a hydraulic cylinder which is connected to the beam, and the hydraulic cylinder may serve as the beam moving unit and the lock mechanism.

With such a configuration, the configuration of the entire device is simplified compared to a case where the beam moving unit and the fixing unit are individually provided.

Further, the hydraulic cylinder may serve as the vertical frame.

With such a configuration, the structure of the entire device is further simplified.

Further, the device may further include a guide member which is provided in the vertical frame and includes a guide rail extending in the vertical direction, and the beam may be connected to the guide rail so as to slide along the guide rail in the vertical direction.

With such a configuration, the movement of the beam and the upper chuck is stabilized.

Further, the guide member may be a linear motion guide which further includes a bearing interposed between the guide rail and the beam and including a rolling element and guides the beam in the vertical direction while rotating the rolling element.

With such a configuration, the beam may be smoothly moved in the vertical direction.

Further, the lower chuck may include a lower spindle housing which is immovably fixed to the lower frame and accommodates the lower rotation member therein. The lower rotation member may include a plunger which is rotatable about the axis extending in the vertical direction, be movable in a telescopic manner in the vertical direction, and include an air supply hole serving as the air supply unit formed therein. The upper end of the plunger may be provided with a lower chuck side inclined surface which is inclined with respect to the vertical direction. The upper chuck may include an upper spindle housing which is fixed to the beam and accommodates the upper rotation member therein. The lower end of the upper rotation member may be provided with an upper chuck side inclined surface which engages with the lower chuck side inclined surface.

In this configuration, the final alignment of the upper and lower chucks is performed by the plunger. For this reason, there is no need to provide a structure for the final alignment in the upper chuck. Then, the configuration of the upper chuck may be simplified and the weight thereof may be decreased. This simplifies the structure for moving the upper chuck, and simplifies the tire testing device.

Here, the plunger may include a tapered convex portion which is formed in the upper end of the plunger and includes the lower chuck side inclined surface in the outer peripheral surface, and the upper rotation member may include a concave portion which is provided in the lower end of the upper rotation member and includes the upper chuck side inclined surface in the inner peripheral surface.

With such a configuration, the upper and lower chucks may appropriately engage with each other with a simple configuration.

Further, the device may further include a plunger position detecting unit which detects a position of the plunger in the vertical direction.

With such a configuration, the upper and lower chucks may further appropriately engage with each other. This realizes the appropriate test of the tire.

Further, the device may further include a control unit which controls a relative position between the upper chuck and the lower chuck in the vertical direction, and the control unit may control a relative position between the upper chuck and the lower chuck based on a position of the plunger detected by the plunger position detecting unit after the upper rotation member engages with the plunger.

With such a configuration, the position precision of the upper and lower chucks may be improved, and the more appropriate test of the tire is realized.

Further, the device may further include: a control unit which controls the moving unit, the fixing unit, and the air supply unit, wherein the upper chuck may include an upper rim which holds a bead of the tire, and wherein the control unit may perform a first position control in which the upper chuck is moved downward in the vertical direction by the moving unit from a position where the upper rim is away from a bead of the tire to a position where the upper rim contacts the bead of the tire and the upper chuck is immovably fixed with respect to the vertical direction by the fixing unit at the position where the upper rim contacts the bead of the tire, a first pneumatic control which is performed after the first position control so that air is supplied to the inner space of the tire by the air supply unit, a second position control which is performed after the first pneumatic control so that the upper chuck is moved upward in the vertical direction by the moving unit to a position where a gap between the upper chuck and the lower chuck in the vertical direction becomes a reference width set based on the width of the tire and the upper chuck is immovably fixed with respect to the vertical direction by the fixing unit at the position where the gap between the upper chuck and the lower chuck in the vertical direction becomes the reference width, and a second pneumatic control which is performed after the second position control so that air is supplied to the inner space by the air supply unit and the pneumatic pressure of the inner space of the tire is set to be higher than the pneumatic pressure during the first pneumatic control.

With such a configuration, since compressed air is supplied to the tire while the upper rim and the bead of the tire contact each other, the leakage of the air from the tire is suppressed. This realizes the appropriate test of the tire.

Further, the device may further include an upper chuck holding member which holds the upper chuck so that the upper chuck is movable in the vertical direction with respect to the beam between a predetermined lower-limit position and a predetermined upper-limit position, wherein the moving unit may move the beam along the pair of vertical frames in the vertical direction, wherein the fixing unit may immovably fix the beam to the pair of vertical frames, wherein the tire testing device may further include a control unit which controls the moving unit, the fixing unit, and the air supply unit, wherein the upper chuck may include an upper rim which holds a bead of the tire, and wherein the control unit may perform a third position control in which the beam is moved downward in the vertical direction by the moving unit from a position where the upper rim is away from the bead of the tire to a position where the upper rim contacts the bead of the tire while the upper chuck is held by the upper chuck holding member at the lower-limit position with respect to the beam and the beam is immovably fixed with respect to the vertical direction by the fixing unit at the position where the upper rim contacts the bead of the tire, a third pneumatic control which is performed after the third position control so that air is supplied to the inner space by the air supply unit and the upper chuck is moved with respect to the beam in the vertical direction by the pneumatic pressure inside the inner space so as to reach a position where a gap between the upper chuck and the lower chuck in the vertical direction becomes a reference width set based on the width of the tire, and a fourth pneumatic control which is performed after the third pneumatic control so that air is supplied to the inner space by the air supply unit and the pneumatic pressure of the inner space is set to be higher than the pneumatic pressure during the third pneumatic control.

With such a configuration, since compressed air is supplied to the tire while the upper rim contacts the bead of the tire, the leakage of the air from the tire is suppressed. This realizes the appropriate test of the tire. Particularly, in this configuration, the upper chuck automatically slides upward in response to the pneumatic pressure of the air supplied to the inner space of the tire during the third pneumatic control. For this reason, there is no need to provide the driving unit for moving the upper chuck in response to the pneumatic pressure, and the structure may be simplified.

Further, the device may further include an axis adjusting unit which is connected to the upper rotation member and causes a horizontal displacement and a horizontal oscillation of the rotating axis of the upper rotation member.

With such a configuration, the axes of the upper rotation member and the lower rotation member may be reliably matched. This realizes an appropriate test of the tire, and suppresses an unnecessary stress applied to each rotation member, so that the life time of the rotation member is extended.

Here, the axis adjusting unit may be a laminated rubber support in which rubber sheets and steel plates are alternately laminated in the up to down direction and which includes a connection surface connected with the upper rotation member and extending in the horizontal direction.

Further, the axis adjusting unit may include two plates which are away from each other in the up to down direction and substantially extend in the horizontal direction, a non-compressible liquid which is enclosed between two plates, and a seal which seals a gap of the two plates, and the upper rotation member may be connected to one plate.

Further, the device may further include a pair of first bearings which is provided in portions away from each other in the up to down direction of the upper rotation member and each of which includes a receiving portion rotatably supporting the upper rotation member and receiving a radial load and an axial load; a pair of second bearings which is provided in portions away from each other in the up to down direction of the lower rotation member and each of which includes a receiving portion rotatably supporting the lower rotation member and receiving a radial load and an axial load; and a radial bearing which is provided in each of the upper rotation member and the lower rotation member and includes a radial load receiving portion rotatably supporting each rotation member and receiving a radial load, wherein the receiving portions of the respective first bearings receive the axial loads applied in different directions in the axial loads applied in the up to down direction, and wherein the receiving portions of the respective second bearings receive the axial loads applied in different directions in the axial loads applied in the up to down direction.

With such a configuration, the radial load generated by the separating force may be appropriately received by one first bearing, one second bearing, and respective radial bearings while receiving the axial load in the up to down direction of the upper rotation member and the lower rotation member by the first bearing and the second bearing. This realizes the reliable support of the upper rotation member and the lower rotation member and the rotational deviation in the radial direction of the rotating axes of the upper rotation member and the lower rotation member in the event of the separating force, and realizes an appropriate test of the tire.

Here, the radial bearing may be a deep groove ball bearing or a cylindrical roller bearing.

Further, the radial bearing may be a double-row cylindrical roller bearing in which a tapered hole is formed about the axis thereof, and the tapered hole may be formed about the axis so that the inner diameter decreases as it moves toward one side in the axial direction.

Further, the radial bearing provided in the upper rotation member may be disposed at a position closer to the first bearing with the receiving portion for receiving the downward axial load among the respective first bearings, and the radial bearing provided in the lower rotation member may be disposed at a position closer to the second bearing with the receiving portion for receiving the upward axial load among the respective second bearings.

In this configuration, the respective radial bearings are disposed near the bearings which may not receive the axial load in the event of the separating force and move away from the respective rotation members in a direction in which the rotational deviation occurs. For this reason, it is possible to effectively suppress the rotational deviation of the respective rotation members by the radial bearing.

Further, each of the first bearings and the second bearings may be a tapered roller bearing provided with a tapered hole which is formed about the axis of the tapered roller bearing so that its inner diameter decreases as it moves toward one side in the axial direction. Further, as the arrangement of the bearings, the axial ends each having a small inner diameter may face each other.

The invention claimed is:

1. A tire testing device which tests a tire, the tire testing device comprising:

a lower frame;

a pair of vertical frames which is supported by the lower frame and respectively extends upward in the vertical direction from portions away from each other in the lower frame;

a beam which bridges between the pair of vertical frames in an extending posture and is supported by the vertical frames;

a lower chuck which includes a lower rotation member rotatable about the axis extending in the vertical direction and is attached to the lower frame;

an upper chuck which includes an upper rotation member rotatable about the axis along the vertical direction along with the lower rotation member and is attached to the center of the beam in the longitudinal direction so as to nip the tire, conveyed to the upper side of the lower chuck, between the upper and lower chucks by the engagement therebetween while an inner space of the tire is sealed;

a moving unit which moves the upper chuck in the vertical direction;

a fixing unit which immovably fixes the upper chuck with respect to the vertical direction; and an air supply unit which supplies air to the inner space while the upper chuck is fixed by the fixing unit and the tire is nipped between the upper chuck and the lower chuck by sealing the inner space, wherein when air is supplied to the inner space of the tire by at least the air supply unit, the rotating axis of the upper rotation member is positioned at the center of a straight line connecting support points where the respective vertical frames support the beam.

2. The tire testing device according to claim 1, wherein the lower chuck is positioned between the pair of vertical frames, wherein the tire passes between the pair of vertical frames and is conveyed to the upper side of the lower chuck, and wherein the arrangement direction of the respective vertical frames is inclined with respect to the tire conveying direction by an angle as an acute angle or an obtuse angle.

3. The tire testing device according to claim 2, further comprising:

a load applying member that applies a load to the tire nipped between the upper chuck and the lower chuck, wherein the load applying member passes between the pair of vertical frames in a direction perpendicular to the tire conveying direction between a position for applying a load to the tire nipped between the upper chuck and the lower chuck and a position away from the load position.

4. The tire testing device according to claim 1, further comprising:

a chuck position detecting unit which detects a relative position between the upper chuck and the lower chuck in the vertical direction.

5. The tire testing device according to claim 1, wherein the moving unit includes a beam moving unit which moves the upper chuck in the vertical direction by moving the beam along the pair of vertical frames in the vertical direction, and wherein the beam moving unit is provided in at least one of the vertical frames.

6. The tire testing device according to claim 5, wherein the fixing unit includes a lock mechanism which immovably fixes the upper chuck with respect to the vertical direction by immovably fixing the beam to the pair of vertical frames, and wherein the lock mechanism is provided in at least one of the vertical frames.

7. The tire testing device according to claim 6, wherein the beam moving unit includes ball screws which are respectively provided in the pair of vertical frames and extend in the vertical direction.

8. The tire testing device according to claim 7, wherein the lock mechanism is an electromagnetic brake which stops the rotation of the ball screw.

9. The tire testing device according to claim 7, wherein the beam moving unit further includes a motor which drives each of the ball screws, and wherein the respective motors drive the respective ball screws in a synchronization state.

10. The tire testing device according to claim 7, wherein the beam moving unit further includes a connection member which connects the respective ball screws to each other and motors which drive the respective ball screws in a synchronization state by the operation of the connection member.

11. The tire testing device according to claim 5, further comprising:

a hydraulic cylinder which is connected to the beam, wherein the hydraulic cylinder serves as the beam moving unit and a lock mechanism.

12. The tire testing device according to claim 11, wherein the hydraulic cylinder serves as the one vertical frame.

13. The tire testing device according to claim 5, further comprising:

a guide member including a guide rail which is provided in the one vertical frame and extends in the vertical direction, wherein the beam is connected to the guide rail so as to slide along the guide rail in the vertical direction.

14. The tire testing device according to claim 13, wherein the guide member is a linear motion guide which further includes a bearing interposed between the guide rail and the beam and including a rolling element and guides the beam in the vertical direction while rotating the rolling element.

15. The tire testing device according to claim 1, wherein the lower chuck includes a lower spindle housing which is immovably fixed to the lower frame and accommodates the lower rotation member therein, wherein the lower rotation member includes a plunger which is rotatable about the axis extending in the vertical direction, is movable in a telescopic manner in the vertical direction, and includes an air supply hole serving as the air supply unit formed therein, wherein the upper end of the plunger is provided with a lower chuck side inclined surface which is inclined with respect to the vertical direction, wherein the upper chuck includes an upper spindle housing which is fixed to the beam and accommodates the upper rotation member therein, and wherein the lower end of the upper rotation member is provided with an upper chuck side inclined surface which engages with the lower chuck side inclined surface.

16. The tire testing device according to claim 15, wherein the plunger includes a tapered convex portion which is formed in the upper end of the plunger and includes the lower chuck side inclined surface in an outer peripheral surface, and wherein the upper rotation member includes a concave portion which is provided in the lower end of the upper rotation member and includes the upper chuck side inclined surface in an inner peripheral surface.

17. The tire testing device according to claim 15, further comprising:
a plunger position detecting unit which detects a position of the plunger in the vertical direction.

18. The tire testing device according to claim 15, further comprising:
a control unit which controls a relative position between the upper chuck and the lower chuck in the vertical direction,
wherein the control unit controls a relative position between the upper chuck and the lower chuck based on a position of the plunger detected by a plunger position detecting unit after the upper rotation member engages with the plunger.

19. The tire testing device according to claim 1, further comprising:
a control unit which controls the moving unit, the fixing unit, and the air supply unit,
wherein the upper chuck includes an upper rim which holds a bead of the tire, and
wherein the control unit performs a first position control in which the upper chuck is moved downward in the vertical direction by the moving unit from a position where the upper rim is away from a bead of the tire to a position where the upper rim contacts the bead of the tire and the upper chuck is immovably fixed with respect to the vertical direction by the fixing unit at the position where the upper rim contacts the bead of the tire, a first pneumatic control which is performed after the first position control so that air is supplied to the inner space of the tire by the air supply unit, a second position control which is performed after the first pneumatic control so that the upper chuck is moved upward in the vertical direction by the moving unit to a position where a gap between the upper chuck and the lower chuck in the vertical direction becomes a reference width set based on the width of the tire and the upper chuck is immovably fixed with respect to the vertical direction by the fixing unit at the position where the gap between the upper chuck and the lower chuck in the vertical direction becomes the reference width, and a second pneumatic control which is performed after the second position control so that air is supplied to the inner space by the air supply unit and the pneumatic pressure of the inner space of the tire is set to be higher than the pneumatic pressure during the first pneumatic control.

20. The tire testing device according to claim 1, further comprising:
an upper chuck holding member which holds the upper chuck so that the upper chuck is movable in the vertical direction with respect to the beam between a predetermined lower-limit position and a predetermined upper-limit position,
wherein the moving unit moves the beam along the pair of vertical frames in the vertical direction,
wherein the fixing unit immovably fixes the beam to the pair of vertical frames,
wherein tire testing device further comprises a control unit which controls the moving unit, the fixing unit, and the air supply unit,
wherein the upper chuck includes an upper rim which holds a bead of the tire, and
wherein the control unit performs a third position control in which the beam is moved downward in the vertical direction by the moving unit from a position where the upper rim is away from the bead of the tire to a position where the upper rim contacts the bead of the tire while the upper chuck is held by the upper chuck holding member at the lower-limit position with respect to the beam and the beam is immovably fixed with respect to the vertical direction by the fixing unit at the position where the upper rim contacts the bead of the tire, a third pneumatic control which is performed after the third position control so that air is supplied to the inner space by the air supply unit and the upper chuck is moved with respect to the beam in the vertical direction by the pneumatic pressure inside the inner space so as to reach a position where a gap between the upper chuck and the lower chuck in the vertical direction becomes a reference width set based on the width of the tire, and a fourth pneumatic control which is performed after the third pneumatic control so that air is supplied to the inner space by the air supply unit and the pneumatic pressure of the inner space is set to be higher than the pneumatic pressure during the third pneumatic control.

21. The tire testing device according to claim 1, further comprising:
an axis adjusting unit which is connected to the upper rotation member and causes a horizontal displacement and a horizontal oscillation of the rotating axis of the upper rotation member.

22. The tire testing device according to claim 21,
wherein the axis adjusting unit is a laminated rubber support in which rubber sheets and steel plates are alternately laminated in the up to down direction and which includes a connection surface connected with the upper rotation member and extending in the horizontal direction.

23. The tire testing device according to claim 21,
wherein the axis adjusting unit includes two plates which are away from each other in the up to down direction and substantially extend in the horizontal direction, a non-compressible liquid which is enclosed between two plates, and a seal which seals a gap of the two plates, and
wherein the upper rotation member is connected to one plate.

24. The tire testing device according to claim 1, further comprising:
a pair of first bearings which is provided in portions away from each other in the up to down direction of the upper rotation member and each of which includes a receiving portion rotatably supporting the upper rotation member and receiving a radial load and an axial load;
a pair of second bearings which is provided in portions away from each other in the up to down direction of the lower rotation member and each of which includes a receiving portion rotatably supporting the lower rotation member and receiving a radial load and an axial load; and
a radial bearing which is provided in each of the upper rotation member and the lower rotation member and includes a radial load receiving portion rotatably supporting each rotation member and receiving a radial load,
wherein the receiving portions of the respective first bearings receive the axial loads applied in different directions in the axial loads applied in the up to down direction, and
wherein the receiving portions of the respective second bearings receive the axial loads applied in different directions in the axial loads applied in the up to down direction.

25. The tire testing device according to claim 24, wherein the radial bearing is a deep groove ball bearing.

26. The tire testing device according to claim 24, wherein the radial bearing is a cylindrical roller bearing.

27. The tire testing device according to claim 24, wherein the radial bearing is a double-row cylindrical roller bearing, and the axis thereof is provided with a tapered hole of which the inner diameter decreases as it moves toward one side in the axial direction.

28. The tire testing device according to claim 24, wherein the radial bearing provided in the upper rotation member is disposed at a position closer to the first bearing with the receiving portion for receiving the downward axial load among the respective first bearings, and wherein the radial bearing provided in the lower rotation member is disposed at a position closer to the second bearing with the receiving portion for receiving the upward axial load among the respective second bearings.

29. The tire testing device according to claim 24, wherein each of the first bearings and the second bearings is a tapered roller bearing provided with a tapered hole which is formed about the axis of the tapered roller bearing so that its inner diameter decreases as it moves toward one side in the axial direction, and the axial ends each having a small inner diameter face each other.

* * * * *